US006698355B2

(12) United States Patent
Fukui

(10) Patent No.: US 6,698,355 B2
(45) Date of Patent: Mar. 2, 2004

(54) PATCH MEASUREMENT DEVICE AND PRINTING APPARATUS INCORPORATING THE SAME

(75) Inventor: Kazuki Fukui, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/396,445

(22) Filed: Mar. 26, 2003

(65) Prior Publication Data

US 2003/0200888 A1 Oct. 30, 2003

(30) Foreign Application Priority Data

Apr. 24, 2002 (JP) ...................................... 2002-122069

(51) Int. Cl.[7] ............................ B41F 1/34; B41F 33/16; B41F 31/00; G01J 3/46

(52) U.S. Cl. ....................... 101/485; 101/211; 101/181; 101/DIG. 45; 101/365; 356/402; 358/298

(58) Field of Search ................................ 101/483, 484, 101/485, 486, 211, DIG. 36, DIG. 46, DIG. 45, DIG. 47, 181, 365; 356/402, 407; 358/298

(56) References Cited

U.S. PATENT DOCUMENTS

| | | | | | |
|---|---|---|---|---|---|
| 4,003,660 | A | * | 1/1977 | Christie, Jr. et al. | 356/407 |
| 4,494,875 | A | * | 1/1985 | Schramm et al. | 356/402 |
| 4,874,247 | A | * | 10/1989 | Watanabe et al. | 356/402 |
| 4,963,028 | A | * | 10/1990 | Braun et al. | 356/445 |
| 4,971,446 | A | * | 11/1990 | Kurata | 356/402 |
| 5,029,527 | A | * | 7/1991 | Jeschke et al. | 101/365 |
| 5,122,977 | A | * | 6/1992 | Pfeiffer | 101/211 |
| 5,182,721 | A | | 1/1993 | Kipphan et al. | |
| 5,598,272 | A | * | 1/1997 | Fisch et al. | 358/298 |
| 5,604,567 | A | * | 2/1997 | Dundas et al. | 399/39 |
| RE35,495 | E | | 4/1997 | Bolza-Schuenemann et al. | |
| 5,673,112 | A | * | 9/1997 | Schramm | 356/402 |
| 5,699,099 | A | * | 12/1997 | Garand et al. | 347/172 |
| 5,816,164 | A | * | 10/1998 | Löffler | 101/484 |
| 5,992,318 | A | * | 11/1999 | DiBello et al. | 101/181 |
| 6,041,708 | A | | 3/2000 | Kipphan et al. | |
| 6,100,982 | A | | 8/2000 | Tobias et al. | |
| 6,147,698 | A | * | 11/2000 | Zable et al. | 399/49 |
| 6,446,555 | B1 | * | 9/2002 | Schramm et al. | 101/365 |
| 6,589,721 | B1 | * | 7/2003 | Arcus et al. | 430/435 |
| 6,622,621 | B2 | * | 9/2003 | Bucher et al. | 101/485 |
| 6,622,625 | B1 | * | 9/2003 | Sugiyama | 101/484 |

FOREIGN PATENT DOCUMENTS

| | | |
|---|---|---|
| EP | 0 518 559 | 12/1992 |
| EP | 1 149 703 | 10/2001 |
| JP | 2000-261618 | 9/2000 |

* cited by examiner

*Primary Examiner*—Eugene H. Eickholt
(74) *Attorney, Agent, or Firm*—McDermott, Will & Emery

(57) ABSTRACT

A patch measurement device which is capable of accurately detecting the position of a patch in a control strip is provided. In a patch measurement device 27, a data storage section 271 stores printed-image data containing a control strip printed on a printed material. A reference mark detection section 272 detects the positions of cross points P corresponding to reference marks rm contained in the printed-image data. An inter-mark distance calculation section 273 calculates a measured shortest distance with respect to the cross point P. An inter-mark distance correction section 274 calculates magnification correcting coefficients k, by utilizing theoretical shortest distances among the cross points P in deployed position information and the measured shortest distance. Based on the magnification correcting coefficients k and the values of pixels constituting the printed-image data, a patch position detection section 275 finalizes the patch position. A color density measurement section 276 measures the color density of the patch whose position has been detected by the patch position detection section 275.

14 Claims, 9 Drawing Sheets

PATCH MEASUREMENT DEVICE AND PRINTING APPARATUS INCORPORATING THE SAME

BACKGROUND OF THE INVENTION

1. Field of the Invention

The present invention relates to a patch measurement device provided in a printing apparatus, and more particularly to a patch measurement device for detecting the positions of patches constituting a control strip which is printed on printing paper.

2. Related Art Statement

There have conventionally been realized printing apparatuses which incorporate a so-called CTP (Computer To Plate) device, i.e., a prepressing device (=a printing plate recording device) that generates an image on a printing plate based on digital image data. A printing apparatus of this type, referred to as a DI (direct imaging) press, is capable of producing printed materials directly from image data, and therefore may be suitable for producing a variety of printed materials, each in relatively small quantities, over short periods of time. While prepress and other processes in such a digital printing apparatus are automated for ease of operation by non-proficient operators, further automation is desired in the control of ink supply, for example, during a printing process.

The control of ink supply in a conventional printing apparatus is generally realized by means of a separate console-type color measurement device, where a produced sample print is measured on a table. In this case, there is a problem in that a human operator needs to take out sample prints from the printing apparatus as necessary to measure the colors appearing on the printed materials.

In order to reduce the amount of work which requires the presence of a human operator as mentioned above, Japanese Patent No. 2824334 discloses a printing apparatus comprising a means for capturing an image of a printed material. In accordance with this printing apparatus, an image of a printed material is captured on an impression cylinder of the printing apparatus, whereby image data is obtained. This image data is compared against reference image data, which is previously read from a printed material that serves as a control reference, and the amount of supplied ink is controlled based on the comparison result. This printing apparatus has an advantage in that there is no need for a human operator as in the case of employing a console-type color measurement device because the printed material is imaged within the printing apparatus.

However, the aforementioned printing apparatus has a problem in that, since an image of the entire printed material must be read for comparison against the reference image, the size of the image data to be handled becomes large, thus requiring a relatively long image data processing time. Since it is necessary to prepare a reference image, this printing apparatus is not suitable for producing relatively few copies of a variety of printed materials, where agility is of the essence.

In order to solve the above problem, a printing apparatus has been proposed which prints a control strip (other than the actual printing image) on a printed material, such that the control strip is measured within the printing apparatus. FIGS. 9A and 9B are diagrams illustrating specific examples of such control strips. Hereinafter, the details of these control strips will be described with reference to FIGS. 9A and 9B.

FIG. 9A is a diagram illustrating a printed material S which maybe obtained by using the conventional printing apparatus. As shown in FIG. 9A, the conventional printing apparatus prints an image im on printing paper, and thereafter prints four control strips cs1 to cs4 and three reference marks rm1 to rm3 on the same printing paper. Hereinafter, such four control strips cs1 to cs4 may collectively be referred to as "control strips cs", and the three reference marks rm1 to rm3 as "reference marks rm".

The image im is printed on the printing paper, beginning at a position (hereinafter referred to as a "print start position") which is located a predetermined gripper margin f away from the leading end of the printing paper. More specifically, the image im is progressively printed in the direction of print progress indicated by the arrow (hereinafter referred to as a "first printing direction"), beginning from the print start position. The image im has a dimension m along the first printing direction, which is designated according to the image size. The control strips cs and the reference marks rm are printed beginning at a position which is a predetermined distance n away from the trailing end of the image im.

As shown in FIG. 9A, the control strips cs are typically printed on the printing paper with predetermined intervals therebetween along a direction (hereinafter referred to as a "second printing direction") perpendicular to the first printing direction, and each control strip cs includes a plurality of rectangular-shaped patches arranged in a predetermined order. Each patch may be a half-tone, linework, or solid image which is printed at a predetermined density in a predetermined color. FIG. 9B illustrates an exemplary patch pc1.

As shown in FIG. 9A, the reference mark rm1 is interposed between two adjoining control strips cs2 and cs3. The reference mark rm2 is interposed between the control strips cs1 and cs2, and the reference mark rm3 is interposed between the control strips cs3 and cs4. As such, the reference marks rm1 to rm3 serve as references based on which to detect the positions of the control strips cs1 to cs4. Typically, as exemplified by the reference mark rm 1 shown in FIG. 9B, a reference mark comprises two bars b1 and b2 which run parallel to the first printing direction, and a cross mark c interposed between the bars b1 and b2. Each patch is printed at a position which is predetermined distances away—along the first and second printing directions—from a crosspoint P of the cross mark c. For example, the patch pc1 is printed so that the center thereof is at a distance h (along the first printing direction) and at a distance w (along the second printing direction) from the crosspoint P of the reference mark rm1.

An image of the printed material S is captured by an imaging device provided in the printing apparatus, and is passed as "printed-image data" (i.e., data representing the actually produced printed material) to a patch processing device which is provided in the printing apparatus. Assuming that the patch pc1 is currently to be processed by the patch processing device, the patch processing device first detects the crosspoint P of the reference mark rm1. Furthermore, the patch processing device estimates that a position which is at the patch distance h (along the first printing direction) and at the patch distance w (along the second printing direction) from the detected crosspoint P should be the relative position of the center of the patch pc1, which is currently to be processed. Thereafter, the patch processing device measures the color density information of the patch pc1 at the estimated relative position.

As mentioned above, each control strip cs includes a plurality of patches which are arranged along the second printing direction. In the case where there are fifteen ink keys in the printing apparatus, the total number of patches would be 60 or more. However, due to limited spaces being available for printing the patches pc and the reference marks rm, the total number of reference marks rm which are printed on the printing paper is disproportionately small relative to the large number of patches. Even if an increased number of reference marks rm are employed, it would only invite an increase in the detection frequency of the reference marks rm, thereby resulting in more time being consumed for measuring the color density information. In this respect, the total number of reference marks rm should be minimized. In order to estimate the positions of a plurality of patches composing each control strip cs relative to a corresponding reference mark rm, the printing apparatus employs "image-to-print data", i.e., data representing an image to be printed on the printing plate, as theoretical deployment data (theoretical values). In other words, this printing apparatus utilizes theoretical deployment data corresponding to the "patch distances" to each patch from a corresponding reference mark rm (i.e., patch distances h and w to the patch pc1 as taken from the reference mark rm1) to estimate a plurality of patch positions relative to the reference marks rm in the printed-image data imaged by the imaging device.

However, the aforementioned patch position estimation will become erroneous unless a fixed relationship is maintained between a referential length on the image-to-print data and a referential length on the printed-image data generated by imaging the printed material S which is printed based on the image-to-print data. One cause for such errors is fluctuations in the imaging magnification associated with the imaging device that images the printed material S, which in turn are ascribable to factors such as: the imaging environment (e.g., temperature), mounting accuracy of the imaging device with respect to the printing apparatus, and/or fluctuations in the position at which the printed material S is imaged (fluctuations in the distance between the imaging device and the printed material S). In particular, changes in the distance between the imaging device and the printed material S may be caused by recoil and like actions of the printed material S during the transportation thereof, since the printed material S is read by the printing apparatus while travelling, thereby making it impossible to obtain stable positioning. Errors in the estimated patch positions due to such fluctuations in the imaging magnification associated with the imaging device become more likely to occur as the total number of reference marks rm is decreased. The magnitude of the errors in the estimated patch positions become greater for patches which are located farther away from the reference marks rm. Due to such errors, the patch processing device in the printing apparatus may end up measuring color density information at positions away from the patch centers, resulting in inaccurate measurements of the color density information.

SUMMARY OF THE INVENTION

Therefore, an object of the present invention is to provide a patch measurement device which is capable of accurately detecting the positions of patches composing a control strip even if the imaging magnification associated with an imaging device fluctuates with respect to a printed material, such a patch measurement device being provided in a printing apparatus.

The present invention has the following features to attain the object mentioned above.

A first aspect of the present invention is directed to a patch measurement device provided in a printing apparatus for detecting a patch position representing a position of a patch in a control strip printed on paper by the printing apparatus, wherein, the control strip and a reference mark are printed on the paper with a prescribed relative distance between the reference mark to the patch, and printed-image data representing the control strip and the reference mark printed on the paper are generated through imaging by an imaging device provided in the printing apparatus, the patch measurement device comprising: a storage section for storing the printed-image data sent from the imaging device; a mark detection section for detecting the reference mark based on the printed-image data stored in the data storage section; a correction section for calculating as a correcting coefficient a ratio between a printed-image data length and a predetermined known length of a position corresponding to the printed-image data length, wherein the printed-image data length is a length on the printed-image data calculated based on the reference mark detected by the mark detection section; and a position detection section for detecting the patch position with respect to the reference mark on the printed-image data, based on the correcting coefficient calculated by the correction section and the prescribed relative distance.

Thus, according to the above structure of the present invention, a ratio between printed-image data and a predetermined known value is calculated as a correcting coefficient, by utilizing a reference mark. In the calculation of a patch position with respect to a reference mark in the printed-image data, a correcting coefficient is applied to a prescribed relative position of the patch, whereby an accurate patch position can be calculated even if the imaging magnification for the printed-image data fluctuates. Therefore, patch positions can be accurately measured even if the imaging magnification (associated with the imaging device which images a printed material) for the printed-image data fluctuates due to reasons associated with the imaging environment (e.g., temperature), mounting accuracy of the imaging device with respect to the printing apparatus, and/or fluctuations in the position at which the printed material is imaged (fluctuations in the distance between the imaging device and the printed material). In particular, stable position measurement is possible even if the distance between the imaging device and the printed material changes due to recoil and like actions of the printed material, which may occur when the printed material is read by the printing apparatus during the transportation of the printed material.

In one embodiment, a plurality of said reference marks is printed on the paper, the mark detection section detects the plurality of reference marks based on the printed-image data stored in the data storage section, the printed-image data length is calculated based on a distance between the plurality of reference marks detected by the mark detection section, and the predetermined known length is the distance between the plurality of reference marks. Thus, a correcting coefficient is calculated based on a distance between reference marks, whereby an accurate correcting coefficient can be calculated. By utilizing a line connecting the reference marks as a reference direction for printing, it becomes possible to extract an accurate patch from the printed-image data even if the printed material is imaged by the imaging device with an offset from the predetermined position. In another embodiment, the position detection section detects the patch position with respect to the reference mark on the printed-image data based on one of the plurality of reference marks that is closest to the patch. As a result, a patch position on the printed-image data can be more accurately detected.

In one embodiment, the control strip and the reference mark are printed on the paper based on image-to-print data representing an image to be printed, and the known length and the relative distance are described in the image-to-print data. In this case, "image-to-print data", i.e., data representing an image to be printed on paper by the printing apparatus, a known length necessary for detecting a patch position and a prescribed relative distance of the patch are easily obtained, thereby making it easy to obtain theoretically-known values. In another embodiment, the known length is set by previously measuring the length of a printed image corresponding to the printed-image data length printed on the paper. In this case, by actually measuring a image printed on paper by the printing apparatus, theoretically-known values can be easily obtained.

In still another embodiment, a plurality of said reference marks are printed on the paper, the imaging device comprises a first and second imaging units, the first and second imaging units generate respectively different first and second read-out image data, each containing at least two said reference marks, such that the printed-image data is generated by synthesizing the first and second read-out image data, the mark detection section detects the plurality of reference marks based on the printed-image data stored in the data storage section, the printed-image data length comprises: a first printed-image data length which is calculated based on a distance between the at least two reference marks contained in a region of the printed-image data generated from the first read-out image data; and a second printed-image data length which is calculated based on a distance between the at least two reference marks contained in a region of the printed-image data generated from the second read-out image data, the known length comprises: a predetermined first known length corresponding to the first printed-image data length; and a predetermined second known length corresponding to the second printed-image data length, the correcting coefficient comprises: a first correcting coefficient which is calculated based on a ratio between the first printed-image data length and the first known length; and a second correcting coefficient which is calculated based on a ratio between the second printed-image data length and the second known length, and the position detection section is operable to: if the patch is within the region of the printed-image data generated from the first read-out image data, detect the patch position with respect to the reference mark on the printed-image data based on the first correcting coefficient and the prescribed relative distance for the patch, and if the patch is within the region of the printed-image data generated from the second read-out image data, detect the patch position with respect to the reference mark on the printed-image data based on the second correcting coefficient and the prescribed relative distance for the patch. In the case where the imaging device is composed of a plurality of imaging units, fluctuations in the imaging magnification for the printed-image data may occur for each imaging unit. However, since two magnification correcting coefficients k are calculated for each of the two regions of the printed-image data which are imaged by the two imaging units (such two regions being generated out of the read-out image data), correction can be performed in accordance with the respective fluctuation in imaging magnification.

The patch measurement device may further comprise a color density measurement section for measuring color density of the patch whose position has been detected by the position detection section. Thus, the position detection section can calculate an accurate patch position, whereby a patch measurement device which can measure accurate color density information is provided.

A second aspect of the present invention is directed to a printing apparatus for printing an image to be printed, a control strip, and a reference mark on paper, comprising: a prepressing mechanism for receiving external image-to-print data representing the image to be printed, and forming the image to be printed, the control strip, and the reference mark on a printing plate, based on the image-to-print data; a printing mechanism for applying at least ink on the printing plate fed from the prepressing mechanism, and transferring the image to be printed, the control strip, and the reference mark from the printing plate having the ink applied thereto onto the paper; an imaging device for imaging, within the printing mechanism, a portion of the paper where at least the control strip and the reference mark are printed, thereby generating printed-image data; and a patch measurement device for, based on the printed-image data generated by the imaging device, detecting a patch position representing a position of a patch in the control strip with respect to the reference mark and measuring color density of the patch, wherein a prescribed relative distance exists between the reference mark to the patch, the patch measurement device comprising: a storage section for storing the printed-image data sent from the imaging device; a mark detection section for detecting the reference mark based on the printed-image data stored in the data storage section; a correction section for calculating as a correcting coefficient a ratio between a printed-image data length and a predetermined known length of a position corresponding to the printed-image data length, wherein the printed-image data length is a length on the printed-image data calculated based on the reference mark detected by the mark detection section; and a position detection section for detecting the patch position with respect to the reference mark on the printed-image data, based on the correcting coefficient calculated by the correction section and the prescribed relative distance; and a color density measurement section for measuring the color density of the patch whose position has been detected by the position detection section, wherein the printing mechanism adjusts the amount of ink to be applied to the printing plate based on the color density of the patch having been measured by the patch measurement device.

Thus, according to the above structure of the present invention, the aforementioned effects according to the first aspect of the present invention can be attained in a printing apparatus.

In one embodiment, a plurality of said reference marks are printed on the paper, and the correction section calculates the printed-image data length based on a distance between the reference marks. In another embodiment, the position detection section detects the patch position with respect to the reference mark on the printed-image data based on one of the plurality of reference marks that is closest to the patch.

A third aspect of the present invention is directed to a patch measurement method for detecting a patch position representing the position of a patch in a control strip printed on paper, wherein the control strip and a reference mark are printed on the paper with a prescribed relative distance between the reference mark to the patch, the method comprising: a storage step of storing printed-image data representing the control strip and the reference mark printed on the paper; a mark detection step of detecting the reference mark based on the printed-image data stored by the data storage step; a correction step of calculating as a correcting coefficient a ratio between a printed-image data length and a predetermined known length of a position corresponding to the printed-image data length, wherein the printed-image data length is a length on the printed-image data calculated based on the reference mark detected by the mark detection step; and a position detection step of detecting the patch position with respect to the reference mark on the printed-image data, based on the correcting coefficient calculated by the correction step and the prescribed relative distance.

Thus, according to the above structure of the present invention, a ratio between printed-image data and a predetermined known value is calculated as a correcting coefficient, by utilizing a reference mark. In the calculation of a patch position with respect to a reference mark in the printed-image data, a correcting coefficient is applied to a prescribed relative position of the patch, whereby an accurate patch position can be calculated even if the imaging magnification for the printed-image data fluctuates. Therefore, patch positions can be accurately calculated even if the imaging magnification for the printed-image data which is obtained by imaging a printed material fluctuates due to reasons associated with the imaging environment (e.g., temperature), the imaging position, and/or fluctuations in the position at which the printed material is imaged. In particular, stable position calculation is possible even if the in the position at which the printed material is imaged fluctuates due to recoil and like actions of the printed material, which may occur when the printed material is read during the transportation thereof.

In one embodiment, a plurality of said reference marks are printed on the paper, the mark detection step detects the plurality of reference marks based on the printed-image data stored by the data storage step, the printed-image data length is calculated based on a distance between the plurality of reference marks detected by the mark detection step, and the predetermined known length is the distance between the plurality of reference marks. In another embodiment, the position detection step detects the patch position with respect to the reference mark on the printed-image data based on one of the plurality of reference marks that is closest to the patch.

In another embodiment, a plurality of said reference marks are printed on the paper, the printed-image data stored by the data storage step represents the control strip and the plurality of reference marks printed on the paper, the printed-image data being generated by synthesizing respectively different first and second read-out image data, each containing at least two said reference marks, the mark detection step detects the plurality of reference marks based on the printed-image data stored by the data storage step, the printed-image data length comprises: a first printed-image data length which is calculated based on a distance between the at least two reference marks contained in a region of the printed-image data generated from the first read-out image data; and a second printed-image data length which is calculated based on a distance between the at least two reference marks contained in a region of the printed-image data generated from the second read-out image data, the known length comprises: a predetermined first known length corresponding to the first printed-image data length; and a predetermined second known length corresponding to the second printed-image data length, the correcting coefficient comprises: a first correcting coefficient which is calculated based on a ratio between the first printed-image data length and the first known length; and a second correcting coefficient which is calculated based on a ratio between the second printed-image data length and the second known length, and the position detection step comprises: if the patch is within the region of the printed-image data generated from the first read-out image data, detecting the patch position with respect to the reference mark on the printed-image data based on the first correcting coefficient and the prescribed relative distance for the patch, and if the patch is within the region of the printed-image data generated from the second read-out image data, detecting the patch position with respect to the reference mark on the printed-image data based on the second correcting coefficient and the prescribed relative distance for the patch.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
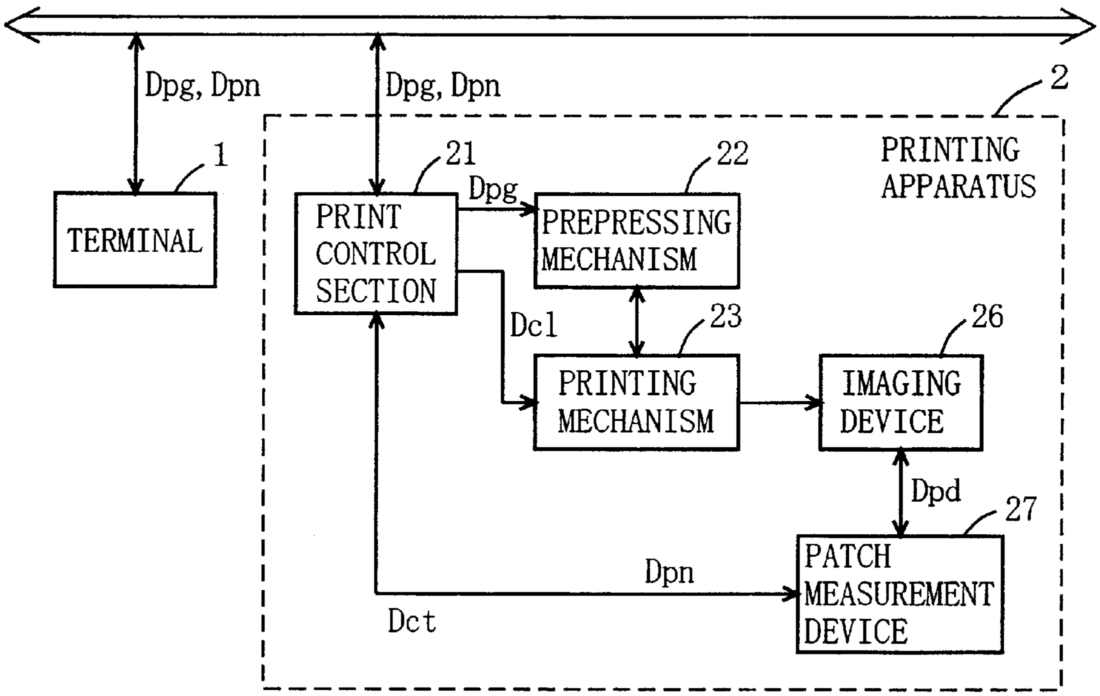
FIG. 1 is a functional block diagram illustrating the structure of a printing system incorporating a patch measurement device 27 according to an embodiment of the present invention.

FIG. 1 is a functional block diagram illustrating the structure of a printing system incorporating a patch measurement device 27 according to an embodiment of the present invention. Via a network, a terminal 1 and a printing apparatus 2 are coupled to the printing system shown in FIG. 1 so as to be capable of communicating with each another.

The terminal 1, which lies external to the printing apparatus 2, is a computer system comprising a CPU, a main storage device, a display device, an input device, and an auxiliary storage device. By operating the terminal 1, an operator edits or generates data based on which an image is formed on a printing plate (hereinafter referred to as "image-to-print data Dpg"), and transmits the image-to-print data Dpg to the printing apparatus 2. As already described with reference to FIGS. 9A and 9B, the image-to-print data Dpg represents an image im (as a main subject of printing by the printing apparatus 2), four control strips cs1 to cs4, and three reference marks rm1 to rm3. Hereinafter, the four control strips cs1 to cs4 may collectively be referred to as "control strips cs", and the three reference marks rm1 to rm3 as "reference marks rm".

The printing apparatus 2 produces a printing plate based on the image-to-print data Dpg received from the terminal 1.

The printing apparatus 2 transfers the ink which has been supplied to the produced printing plate onto a printing paper, gradually proceeding in a direction of print progress indicated by an arrow in FIGS. 9A and 9B (hereinafter referred to as a "first printing direction"). Thus, the printing apparatus 2 prints the image im shown in FIG. 9A, followed by the four control strips cs1 to cs4 and the three reference marks rm1 to rm3.

The image im is printed on the printing paper, beginning at a position (hereinafter referred to as a "print start position") which is located a predetermined gripper margin f away from the leading end of the printing paper. More specifically, the image im is progressively printed in the first printing direction, beginning from the print start position. The image im has a dimension m along the first printing direction, which is to be designated according to the image size. The control strips cs and the reference marks rm are printed beginning at a position which is a predetermined distance n away from the trailing end of the image im. Therefore, the approximate positions of the control strips cs and the reference marks rm on the printed material S along the first printing direction can be easily determined.

Figure 9A:
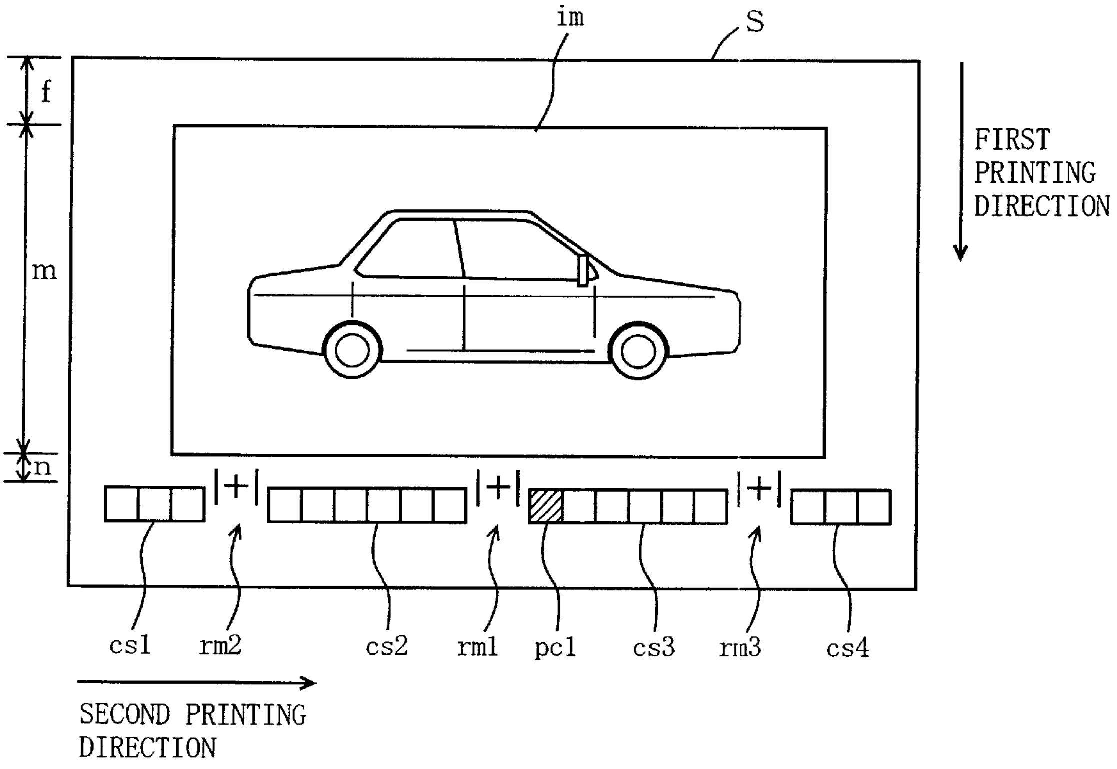
FIGS. 9A and 9B are diagrams illustrating control strips cs which are printed by a conventional printing apparatus.
Figure 9B:
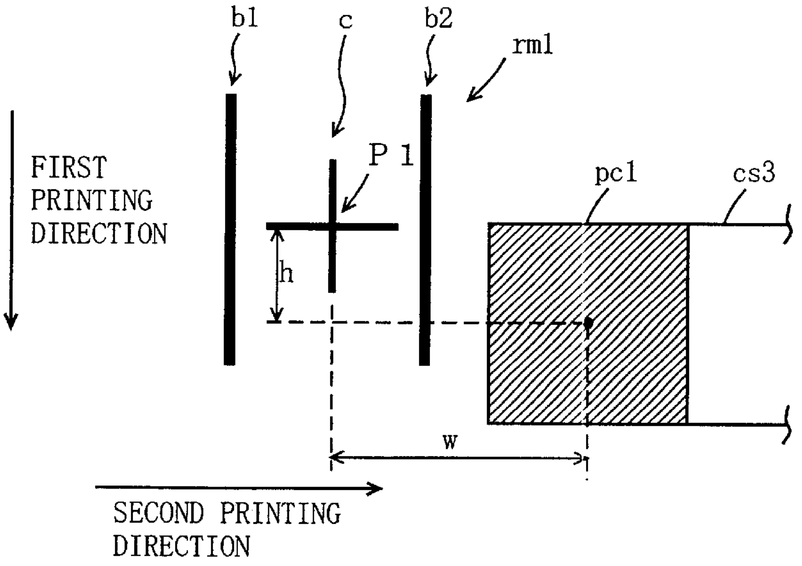

As shown in FIG. 9A, the control strips cs are typically printed side by side on the printing material S with predetermined intervals therebetween along a direction (hereinafter referred to as a "second printing direction") perpendicular to the first printing direction, and each control strip cs includes a plurality of rectangular-shaped patches arranged in a predetermined order. Each patch may be a half-tone, linework, or solid image which is printed with a predetermined density in a predetermined color. FIG. 9B illustrates an exemplary patch pc1.

As shown in FIG. 9A, the reference mark rm1 is interposed between two adjoining control strips cs2 and cs3. The reference mark rm2 is interposed between the control strips cs1 and cs2, and the reference mark rm3 is interposed between the control strips cs3 and cs4. As such, the reference marks rm1 to rm3 serve as references based on which to detect the positions of the control strips cs1 to cs4. Typically, as exemplified by the reference mark rm 1 shown in FIG. 9B, a reference mark comprises two bars b1 and b2 which run parallel to the first printing direction, and a cross mark c interposed between the bars b1 and b2. Each patch is printed at a position which is predetermined distances (hereinafter referred to as "patch distances") away—along the first and second printing directions—from the crosspoint (P1 to P3) of the cross mark c of a corresponding reference mark (rm1 to rm3). For example, the patch pc1 is printed so that the center thereof is at a patch distance h (along the first printing direction) and at a patch distance w (along the second printing direction) from the crosspoint P of the reference mark rm1. The image-to-print data Dpg is generated in such a manner that the control strip cs1 and cs4 are positioned in a point-symmetrical relationship around the crosspoint P of the reference mark rm1, and that the control strips cs2 and cs3 are positioned in a similar point-symmetrical relationship. Hereinafter, the crosspoints P1 to P3 may collectively be referred to as "crosspoints P".

Figure 2:
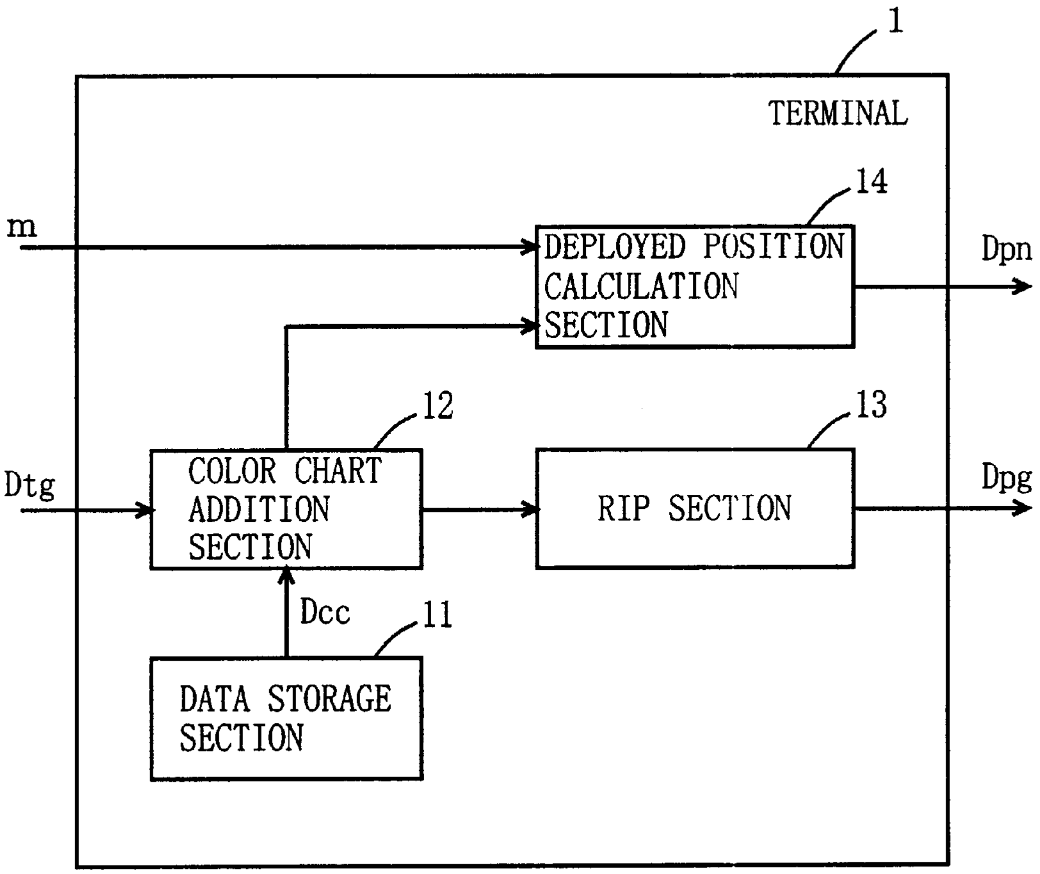
FIG. 2 is a functional block diagram illustrating the detailed structure of a terminal 1 shown in FIG. 1.

Hereinafter, the details of the terminal 1 for producing the aforementioned image-to-print data Dpg will be described with reference to FIG. 2. FIG. 2 is a functional block diagram illustrating the detailed structure of the terminal 1 shown in FIG. 1. As shown in FIG. 2, the terminal 1 comprises a data storage section 11, a color chart addition section 12, an RIP section 13, and a deployed position calculation section 14. The data storage section 11 previously stores color chart data Dcc representing the reference marks rm and control strips cs. Subject image data Dtg representing the image im to be printed is externally supplied to the color chart addition section 12. As described above, the subject image data Dtg is generated or edited by the terminal 1. The color chart addition section 12 adds the color chart data Dcc (which is stored in the data storage section 11) to the received subject image data Dtg. The RIP section 13 performs an RIP (Raster-Image-Processing) for the subject image data Dtg to which the color chart data Dcc has been added, thereby generating the aforementioned image-to-print data Dpg in the form of binary data. The RIP section 13 transmits the generated image-to-print data Dpg to a print control section 21 in the printing apparatus 2 via the network.

According to the present embodiment, the color chart addition section 12 automatically performs the aforementioned processes in accordance with a predetermined deployment condition, e.g., "add control strips cs and reference marks rm at a position following the image in to be printed". Alternatively, an operator may manually determine how the control strips cs and the like are deployed.

The deployed position calculation section 14 calculates the positions of the control strips cs and the reference marks rm. For example, if the predetermined deployment condition used in the color chart addition section 12 is "add control strips cs and reference marks rm at a position following the image im to be printed", the deployed position calculation section 14 can calculate the position of the control strips cs and the reference marks rm on the printing paper by adding the predetermined gripper margin f and the dimension m of the image im (see FIG. 9A). Herein, the terminal 1 may derive the dimension m of the image im directly from the aforementioned subject image data Dtg, or the dimension m may be obtained from an external image data generation device (not shown) which actually generated the subject image data Dtg. Via the network, the deployed position calculation section 14 transmits the thus-calculated deployed position to the print control section 21 in the printing apparatus 2 as deployed position information Dpn. In the case where an operator deploys the control strips cs and the reference marks rm at arbitrary positions, the deployed position calculation section 14 may calculate the deployed position based on the relative positions of the control strips cs and the reference marks rm with respect to the image im represented by the subject image data Dtg.

Referring back to FIG. 1, the printing apparatus 2 comprises: the print control section 21, a prepressing mechanism 22, a printing mechanism 23, an imaging device 26, and the patch measurement device 27. The print control section 21, which is a computer system realized by means of a CPU and like elements mounted on a substrate, controls the prepressing mechanism 22 and the printing mechanism 23 via various interfaces. In a typical process, the print control section 21 receives image-to-print data Dpg from the terminal 1 via the network, and sends the received image-to-print data Dpg to the prepressing mechanism 22. In another typical process, the print control section 21 receives the deployed position information Dpn from the terminal 1 via the network and sends the deployed position information Dpn to the patch measurement device 27. Furthermore, based on color density information Dct (described later) provided from the patch measurement device 27, the print control section 21 generates control information Dcl, which is used for adjusting the supply amounts of ink and/or dampening water used in the printing mechanism 23 (described later).

Based on the image-to-print data Dpg sent from the print control section 21, the prepressing mechanism 22 forms an image on a printing plate. By employing a printing plate which is formed by the prepressing mechanism 22 or obtained from another source, the printing mechanism 23 transfers an ink image onto printing paper.

Figure 3:
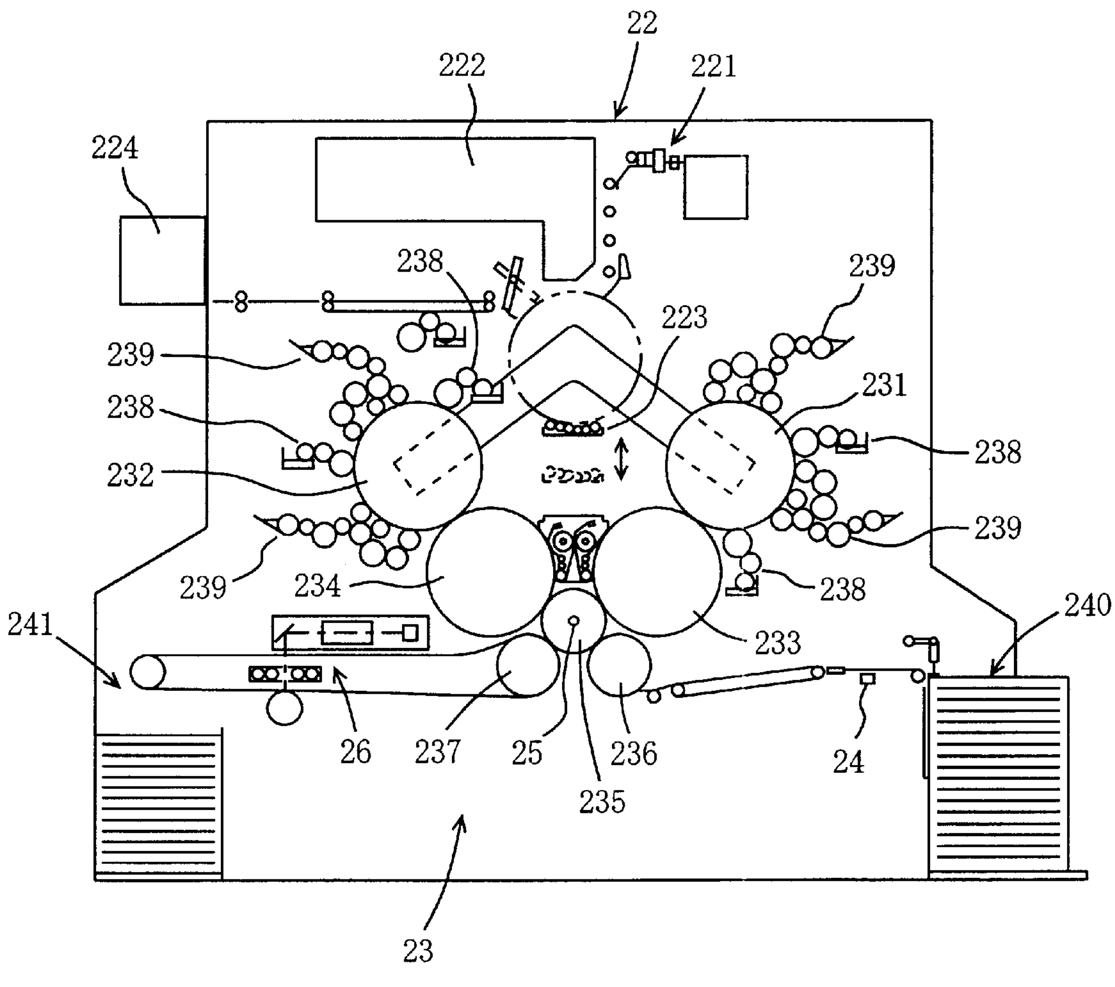
FIG. 3 is a schematic side view illustrating a prepressing mechanism 22 and a printing mechanism 23 shown in FIG. 1.

Hereinafter, detailed structures of the prepressing mechanism 22 and the printing mechanism 23 will be described with reference to FIG. 3. FIG. 3 is a schematic sideview illustrating the prepressing mechanism 22 and the printing mechanism 23 shown in FIG. 1. Referring to FIG. 3, the prepressing mechanism 22, which performs a prepress process, comprises a printing plate supply section 221, an image recording section 222, a development section 223, and a printing plate discharging section 224. The printing plate supply section 221 includes a supply cassette, transportation rollers, a transportation guide, and a cutter, although not shown in detail. The supply cassette accommodates an unexposed printing plate, which is rolled up for storage in a state shielded from light. A silver plate may be used for the printing plate, for example. The transportation rollers and the transportation guide pull out the unexposed printing plate accommodated in the supply cassette, and transports the unexposed printing plate to the plate drums 231 and 232. The cutter cuts the printing plate which is transported by the transportation rollers into separate sheets. Each sheet of unexposed printing plate is retained by the plate drums 231 and 232 (described in detail later).

Although not shown in detail, the image recording section 222 includes a laser, and a deflector such as a polygon mirror. The image recording section 222 modulates a laser light beam in accordance with the image-to-print data Dpg supplied to the prepressing mechanism 22 so as to subject the printing plate retained by the plate drums 231 and 232 to exposure, whereby the image im, all control strips cs and all reference marks rm as shown in FIG. 9A are recorded on the printing plate. The laser is driven in accordance with the image-to-print data Dpg so as to emit a laser light beam which is modulated in accordance with the image-to-print data Dpg. The deflector deflects the laser light beam emitted from the laser, whereby a horizontal scanning with the laser light beam occurs along the axial direction of the plate drum 231 or 232. Furthermore, a vertical scanning with the deflected laser light beam also occurs along the respective direction of rotation as the plate drum 231 or 232 rotates during the horizontal scanning. Alternatively, the scanning may be achieved by employing a plurality of lasers provided side by side along the axial direction of the plate drums 231 and 232, and performing a horizontal scanning with the rotations of the plate drums 231 and 232. Instead of employing an exposure technique, the image recording section 222 may record the image im, all control strips cs, and all reference marks rm by heating or electrical discharge technique.

The development section 223 performs a development process for the printing plate which has been subjected to exposure by the image recording section 222. Although not shown in detail, the development section 223 includes a processing bath, an application roller, and a moving mechanism. The processing bath stores a processing agent which is necessary for the development of the printing plate. The application roller takes up the processing agent from the processing bath and applies it to the printing plate retained by the plate drum 231 or 232, whereby the printing plate undergoes a development process. Immediately before the development of the printing plate occurs, the moving mechanism moves the application roller from a position retracted away from the plate drum 231 or 232 to a position neighboring them. After the development of the printing plate is completed, the application roller retracts the moving mechanism from the position neighboring the plate drum 231 or 232 to the retracted position. Thus, only during the development does the application roller approach the plate drum 231 or 232 to enable the processing agent to be applied on the printing plate. In the case where the image recording method employed in the image recording section 222 does not require a development process, the development section 223 may be omitted from the prepressing mechanism 22.

After the printing process by the printing mechanism 23 is completed, the printing plate discharging section 224 discharges the exposed printing plate, which is no longer of use. Although not shown in detail, the printing plate discharging section 224 includes a releasing section, transportation rollers, a transportation guide, and a discharge cassette. From the plate drums 231 and 232, the releasing section releases the printing plate on which an image has already been formed. The transportation rollers and transportation guide function to transport the printing plate which has been released from the plate drums 231 and 232 by the releasing section to the discharge cassette. The discharge cassette accommodates the printing plate which has been transported by the transportation rollers and the like.

Still referring to FIG. 3, the printing mechanism 23, which performs a printing process, comprises the plate drums 231 and 232, blanket drums 233 and 234, an impression cylinder 235, a feed drum 236, a discharge drum 237, dampening water supply units 238, ink supply units 239, a feed unit 240, and a discharge unit 241. The plate drums 231 and 232 each have a cylindrical shape, with the same diameter. A gripper unit (not shown) is provided on the cylindrical surface of each of the plate drums 231 and 232. Each gripper unit stabilizes two printing plates (corresponding to two colors) on the respective cylindrical surface, at opposing positions which are apart by 180°. By the action of a plate drum driving mechanism (not shown), the plate drum 231 moves between a first printing position (as illustrated in FIG. 3 with a solid line near the units 238 and 239 on the right-hand side) and an image recording position (as illustrated in FIG. 3 with a double-dash line). Similarly, by the action of a plate drum driving mechanism (not shown), the plate drum 232 moves between a second printing position (as illustrated in FIG. 3 with a solid line near the units 238 and 239 on the left-hand side) and the aforementioned image recording position. As described later in more detail, the plate drums 231 and 232 are alternately placed in the image recording position during a prepress process.

While the plate drum 231 or 232 is situated in the image recording position, the aforementioned printing plate which has been transported from the printing plate supply section 221 is set on the plate drum 231 or 232 in the following manner. A gripper unit (not shown) is provided on the cylindrical surface of the plate drum 231. In the image recording position, the gripper unit printing plate stabilizes two printing plates (corresponding to two colors), which has been transported from the printing plate supply section 221, at opposing positions which are apart by 180° on the cylindrical surface. Thereafter, the above-described prepress process is performed, whereby the image recording section 222 forms the image im, all control strips cs and all references mark rm (see FIG. 9A) on each printing plate retained by the plate drum 231. Then, a similar process is performed for the plate drum 232 as for the plate drum 231, whereby the image recording section 222 forms the image im, all control strips cs and all references mark rm on each of the printing plates corresponding to two colors retained by the plate drum 232. During a subsequent printing process, the plate drums 231 and 232 are placed in the first and second printing positions, as described later in detail.

The blanket drums 233 and 234 have substantially the same diameter as those of the plate drums 231 and 232. On the cylindrical surface of each of the blanket drums 233 and 234, a blanket is mounted, onto which two ink images (corresponding to two colors) obtained from the plate drums 231 and 232, respectively, are to be transferred. The blanket drum 233 is disposed so as to be capable of rotating in abutment with the plate drum 231 situated in the first printing position. The blanket drum 234 is disposed so as to be capable of rotating in abutment with the plate drum 232 situated in the second printing position.

The impression cylinder 235 has a diameter which is substantially ½ of those of the plate drums 231 and 232. A gripper unit (not shown) is provided on the cylindrical surface of the impression cylinder 235. The gripper unit is opened and closed by an open/close mechanism (not shown) with predetermined timing, so as to grip the leading end of a printing paper sheet having a size corresponding to the printing plate of each color (see FIG. 9A). The impression cylinder 235 is disposed so as to be capable of rotating in abutment with both of the blanket drums 233 and 234. An encoder 25 is provided on the rotation axis of the impression cylinder 235. The encoder 25 is generally employed to detect the rotary position of the impression cylinder 235. According to the present embodiment, in particular, the encoder 25 detects the transported position of the printing paper as retained by the impression cylinder 235.

The feed drum 236, which has substantially the same diameter as the impression cylinder 235, is disposed so as to be capable of rotating in abutment with the impression cylinder 235. A gripper unit (not shown) is affixed on the cylindrical surface of the feed drum 236, as also on the cylindrical surface of the impression cylinder 235. The gripper unit functions in synchronization with the gripper unit on the impression cylinder 235 to grip one sheet of printing paper which is fed from the feed unit 240 (described later). Then, as the feed drum 236 rotates, the gripper unit transports one sheet of printing paper over to the gripper unit on the impression cylinder 235.

The discharge drum 237 has substantially the same shape and structure as the feed drum 236. A gripper unit (not shown) on the discharge drum 237 grips the printing paper which is transported from the impression cylinder 235, in a manner similar to the gripper unit on the feed drum 236, except that the gripper unit transports the printing paper over to the discharge unit 241 (described later) as the discharge drum 237 rotates.

On a side face of each of the plate drums 231 and 232 in the aforementioned first and second printing positions, respectively, the blanket drums 233 and 234, the impression cylinder 235, the feed drum 236, and the discharge drum 237, a driving gear (not shown) having the same diameter as the respective drum is attached, such that the driving gears disposed on any two abutting drums engage each other. A print driving motor (not shown) is provided in the printing apparatus 2 to drive the respective driving gears, whereby the aforementioned seven drums rotate in synchronization.

As described above, the plate drums 231 and 232 and the blanket drums 233 and 234 have a circumference which is twice that of the impression cylinder 235. Therefore, the impression cylinder 235 makes two rotations while the plate drums 231 and 232 in the first and second printing positions and the blanket drums 233 and 234 make a single rotation. On the cylindrical surface of each of the plate drums 231 and 232, printing plates corresponding to two colors are stabilized at opposing positions which are apart by 180°. Accordingly, as the impression cylinder 235 makes two rotations while retaining printing paper thereon, the image im, the control strips cs, and the reference marks rm formed on the four printing plates (corresponding to four colors) retained by the plate drums 231 and 232 are transferred on the printing paper in superposition, thereby achieving four-color printing.

Two pairs of dampening water supply units 238 are provided in the printing mechanism 23, one pair being associated with each of the plate drums 231 and 232. Specifically, one pair of dampening water supply units 238 is disposed near the plate drum 231 in the first printing position for selectively supplying dampening water to the two printing plates (corresponding to two colors) retained by the plate drum 231. The other pair is disposed near the plate drum 232 in the second printing position for selectively supplying dampening water to the two printing plates (corresponding to two colors) on the plate drum 232. As mentioned earlier, these supply amounts are adjusted in accordance with control information Dcl (described later), which is generated by the print control section 21 based on the color density information Dct provided from the patch measurement device 27. In order to realize the above function, each dampening water supply unit 238 comprises a water bin, dampening water rollers, and a cam mechanism, although not shown in detail. The water bin stores dampening water. The dampening water rollers take up dampening water from the water bin, and supply it to a corresponding printing plate retained by the plate drum 231 or 232. When supplying dampening water to the printing plate, the cam mechanism moves the dampening water roller abutting with the printing plate from the position retracted away from the plate drum 231 or 232 to a position neighboring them. Furthermore, after the supply of dampening water has been completed, the cam mechanism retracts the dampening water roller abutting with the printing plate from the position neighboring the plate drum 231 or 232 back to the retracted position. In the case where the printing plates used are of a type which does not require dampening water, the dampening water supply units 238 can be omitted.

Two pairs of ink supply units 239 are provided in the printing mechanism 23, one pair being associated with each of the plate drums 231 and 232. Specifically, one pair of ink supply units 239 is disposed near the plate drum 231 in the first printing position for selectively supplying ink to the two printing plates (corresponding to two colors) retained by the plate drum 231; for example, this pair of ink supply units 239 may respectively supply inks of B (black) and M (magenta) to the printing plates on the plate drum 231. The other pair is disposed near the plate drum 232 in the second printing position for selectively supplying ink to the two printing plates (corresponding to two colors) on the plate drum 232; for example, this other pair of ink supply units 239 may respectively supply inks of C (cyan) and Y (yellow) to he printing plates on the plate drum 231. In order to realize the above function, each ink supply unit 239 comprises an ink duct, a plurality of ink rollers, and a cam mechanism, although not shown in detail. The ink duct, which stores an ink of a predetermined color, supplies the ink in a number of regions on the printing plate along the second printing direction, by way of a plurality of ink rollers. As mentioned earlier, these supply amounts are adjusted in accordance with control information Dcl (described later), which is generated by the print control section 21 based on the color density information Dct provided from the patch measurement device 27. The ink rollers knead the ink supplied from the ink duct and supplies it to the printing plate. When supplying ink to the printing plate, the cam mechanism moves the ink rollers abutting with the printing plate from the position retracted away from the plate drum 231 or 232 to a position neighboring them. Furthermore, after the supply of ink has been completed, the cam mechanism retracts the ink rollers abutting with the printing plate from the position neighboring the plate drum 231 or 232 back to the retracted position.

Note that some of the dampening water supply units 238 are arranged so as to be capable of escaping the moving paths of the plate drums 231 and 232, in order to allow the plate drums 231 and 232 to move from the first and second printing positions, respectively, to the image recording position. The same is also true of some of the ink supply units 239.

The feed unit 240 takes out each sheet of printing paper from a pile of unused printing paper, and passes it to the feed drum 236. Since printing for one sheet of printing paper occurs with every two rotations of the impression cylinder 235 (as described above), the feed unit 240 passes one sheet of printing paper to the feed drum 236 with every two rotations of the feed drum 236 according to the present embodiment. The feed unit 240 includes a printing paper sensor 24 for optically detecting the passage of printing paper. The printing paper sensor 24 is generally employed to detect stuck paper or accidental taking of two sheets of paper. According to the present embodiment, based on the result of detection by the printing paper sensor 24, the feed unit 240 can determine whether printing paper is being supplied to the impression cylinder 235 or the feed drum 236, or no printing paper is being supplied to the impression cylinder 235 or the feed drum 236.

The discharge unit 241 receives the printing paper which has undergone printing (hereinafter referred to as a "printed material S") from the discharge drum 237, and allows the printed materials S to be piled up in itself.

Figure 4:
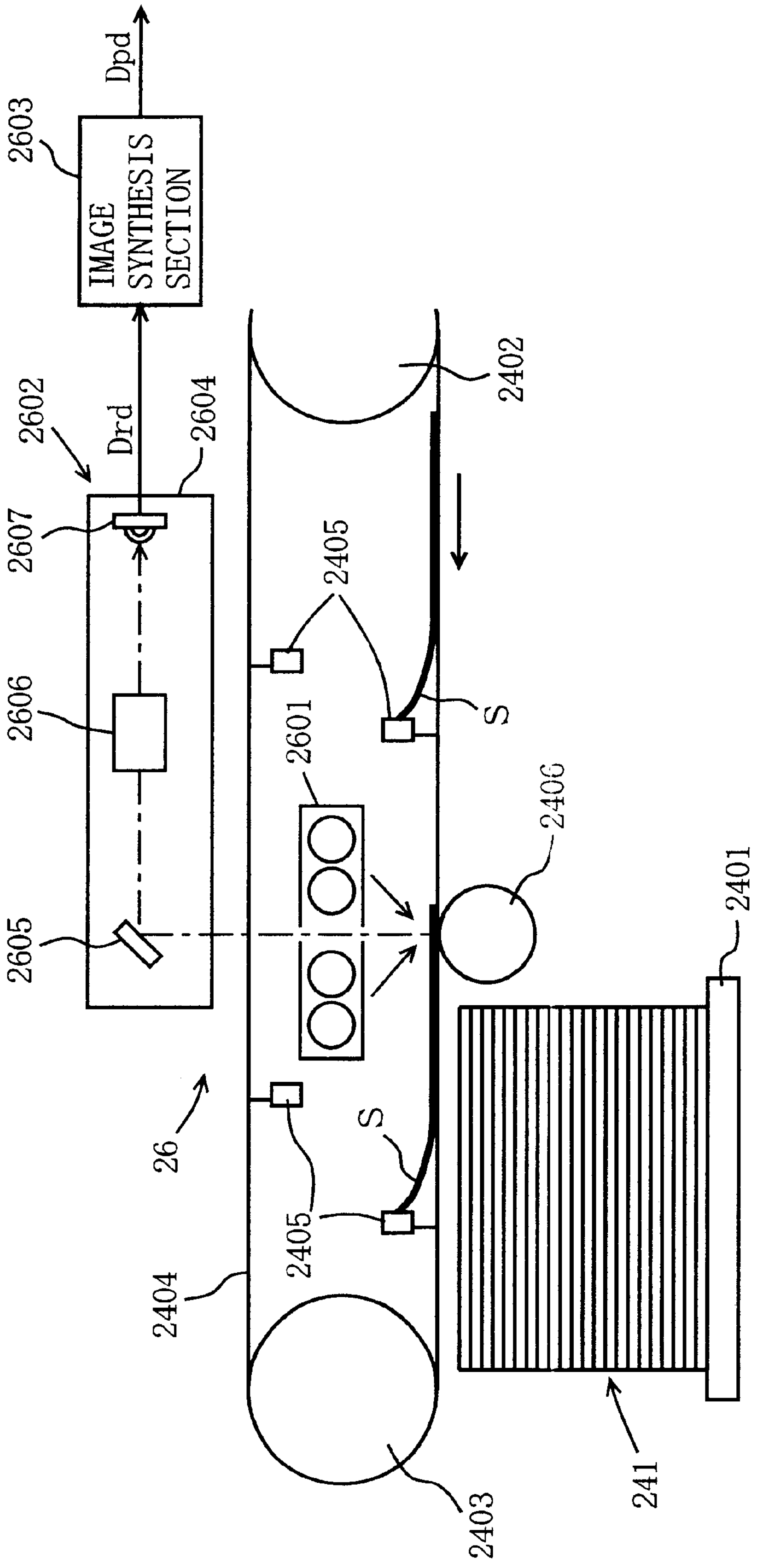
FIG. 4 is a schematic side view illustrating the detailed structures of a discharge unit 241 shown in FIG. 3 and an imaging device 26.

Hereinafter, the details of the discharge unit 241 as well as the imaging device 26 will be described with reference to FIG. 4. FIG. 4 is a schematic side view illustrating the detailed structures of the discharge unit 241 shown in FIG. 3 and the imaging device 26 according to the present embodiment of the present invention. The discharge unit 241 comprises a discharge base 2401, two pairs of gears 2402 and 2403, two endless chains 2404, and a plurality of gripper units 2405. Note that FIG. 4 only shows one of the gears 2402, one of the gears 2403, and one of the chains 2404 due to its nature as a side view. The discharge base 2401 is a palette-like member on which a number of printed materials S can be piled up. The discharge base 2401 is moved in up and down directions by an elevation mechanism (not shown). Specifically, the discharge base 2401 is gradually lowered as more printed materials S are piled up. Since this allows the topmost printed material S in the pile to be maintained at a substantially constant height, the discharging of printed materials S can be made smooth. The two gears 2402 are respectively affixed on the opposing side faces of the discharge drum 237, so as to have the same rotation axis as the discharge drum 237. The gears 2403 have a common rotation axis, which is in parallel to the rotation axis of the discharge drum 237 and extends above the discharge base 2401. Each chain 2404 has a length equal to an integer multiple of the circumference of the discharge drum 237, and is wound around one of the gears 2402 and one of the gears 2403 that are provided on the same side.

The gripper unit 2405 is fixed astride the two chains 2404. On the chain 2404, any two consecutive gripper units 2404 are provided at a fixed distance which is substantially equal to the circumference of the discharge drum 237. Each gripper unit 2404 has claws which are opened or closed to grip a printed material S. The claws are arranged so as to open or close in synchronization with the gripper unit (not shown) on the discharge drum 237 by a cam mechanism (not shown), and receive the printed material S which is transported from the discharge drum 7. The rotations of the two pairs of gears 2402 and 2403 drive the chains 2404 from the discharge drum 237 toward the discharge base 2401. Through this action, each gripper unit 2405 transports a printed material S, and as the claws open above the discharge base 2401, allows the printed material S to be piled on the discharge base 2401.

Since each gripper unit 2405 in the discharge unit 241 only grips one end of the printed material S, each printed material S is transported without its trailing end being fixed, which might allow a recoil of the printed material S to occur. Therefore, according to the present embodiment, in order to minimize the recoil of the printed material S, a suction roller 2406 for controlling the transportation of the printed material S is provided between the discharge drum 237 and the discharge base 2401. A large number of minute suction apertures are provided on the outer surface of the suction roller 2406, which are connected to a vacuum pump (not shown). The suction roller 2406 is disposed in such a manner that its axis extends in parallel to each gripper unit 2405 bridging the two chains 2404, and that the upper end of the suction roller 2406 is positioned at substantially the same height as the lower ends of the chains 2404. The suction roller 2406 is arranged so as to be driven to rotate in accordance with the travelling speed of the gripper unit 2404, or simply capable of freely rotating. Thus, when travelling over the suction roller 2406, each printed material S moves while being sucked onto the surface of the suction roller 2406. As a result, the printed material S is prevented from recoiling at least when travelling over the suction roller 2406. Instead of the suction roller 2406, a suction plate may be employed which sucks the printed material S onto a planar surface.

The imaging device 26 comprises a lighting unit 2601, two imaging units 2602, and an image synthesis section 2603. Note that, due to its nature as a side view, FIG. 4 only shows one of the two imaging units 2602, which are disposed along a direction perpendicular to the plane of the drawing. The lighting unit 2601 illuminates each printed material S which is transported by the action of the chains 2404. More specifically, the lighting unit 2601 is disposed above the suction roller 2406 and between the chains 2404. The lighting unit 2601 comprises a plurality of linear light sources for illuminating a printed material S which is situated on the suction roller 2406. A slit is formed in the central portion of each linear light source, such that the reflected light from the printed material S (which originates from the linear light source) passes through the slit to enable image capturing.

Each imaging unit 2602 captures an image of the illuminated printed material S through the slit in the lighting unit 2601, thereby generating printed-image data Dpd (hereinafter also referred to as "imaged data") representing the image im, the control strips cs, and the reference marks rm (see FIGS. 9A and 9B). Throughout the present specification, image capturing in this sense may also be simply referred to as "imaging". In order to realize the above function, the imaging unit 2602 comprises a housing 2604 for light-shielding and dust prevention purposes, a mirror 2605, a lens 2606, and a CCD line sensor 2607. The mirror 2605, the lens 2606, and the CCD line sensor 2607 are accommodated within the housing 2604. The mirror 2605 reflects the light which has passed through the slit toward the lens 2606. The reflected light from the mirror 2605 is converged by the lens 2606 so as to be received by the CCD line sensor 2607. The CCD line sensor 2607 reads images with respect to the three colors of RGB (i.e., red, green, and blue). According to the present embodiment, as the printed material S is transported, the printed material S is sequentially read in a line-by-line manner. Thus, by the time the entire (i.e., from the leading end to the trailing end) printed material S has passed immediately under the lighting unit 2601, the CCD line sensor 2607 will have produced read-out image data Drd, from which printed-image data Dpd corresponding to one printed material S is generated.

In the present embodiment, the two imaging units 2602 are disposed along a direction perpendicular to the plane of the drawing of FIG. 4, as mentioned above. The imaging units 2602 capture images of two split portions of the printed material S to generate respective read-out image data Drd, the division being made along the second printing direction.

Figure 5:
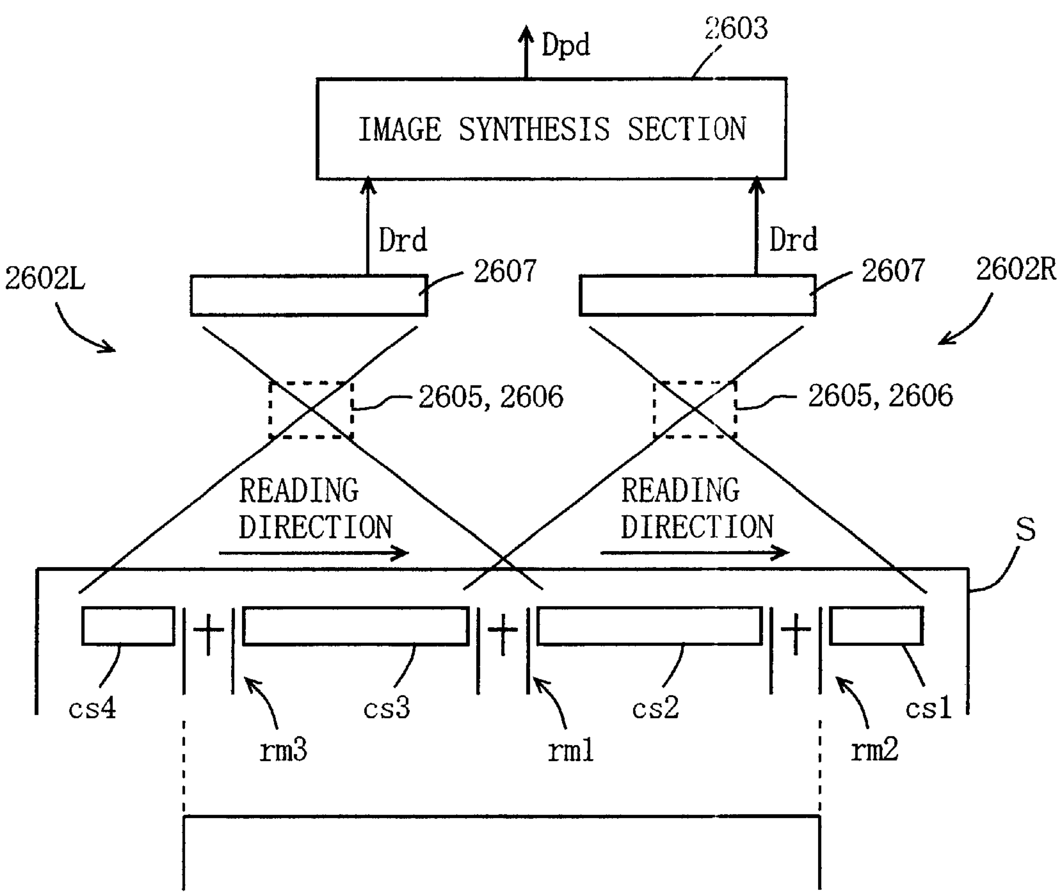
FIG. 5 is a diagram for specifically describing two imaging units 2602 shown in FIG. 4.

FIG. 5 is a diagram for specifically describing the two imaging units 2602 shown in FIG. 4. For conciseness, the imaging unit appearing on the left-hand side of FIG. 4 will hereinafter be referred to as the "imaging unit 2602L" and the other imaging unit as the "imaging unit 2602R". As described above, the imaging regions of the imaging unit 2602L and the 2602R generally correspond to the left-side portion and the right-side portion of the printed material S, respectively. Both imaging regions are arranged so as to overlap preferably in the neighborhood of a center line (extending parallel to the first printing direction of the printed material S). Moreover, the printing apparatus 2 is arranged so as to print the reference marks rm1 to rm3 at positions which will be safely within a printed material S having a marginal (i.e., minimum usable) width. The image-to-print data Dpg is generated in such a manner that the reference mark rm1 will be positioned in the aforementioned overlapping region.

On the other hand, the reference marks rm2 and rm3 are printed near the left and right ends of the printed material S, so that the reference marks rm1 and rm2 will be imaged by the imaging unit 2602L and that the reference marks rm1 and rm3 will be imaged by the imaging unit 2602R. Thus, each of the imaging units 2602L and 2602R images two reference marks rm. Based on such detection of the positions of the reference marks rm1 to rm3, it is possible to ascertain the approximate positions of the control strips cs1 to cs4 because they are supposed to be printed at predetermined positions relative to the detected reference marks rm1 to rm3. In order to be able to image a single printed material S by means of the imaging units 2602L and 2602R, the respective CCD line sensors 2607 in the imaging units 2602L and 2602R are oriented so that their reading directions coincide.

The image synthesis section 2603 receives the read-out image data Drd from the two imaging units 2602, and through position matching based on the reference mark rm1, synthesizes the read-out image data Drd which have been read by the imaging units 2602L and 2602R to generate printed-image data Dpd representing a single printed material S. Furthermore, the image synthesis section 2603 sends the generated printed-image data Dpd to the patch measurement device 27.

The patch measurement device 27 (FIG. 1) measures the color density of the patches composing each control strip cs printed on the printing paper.

Figure 6:
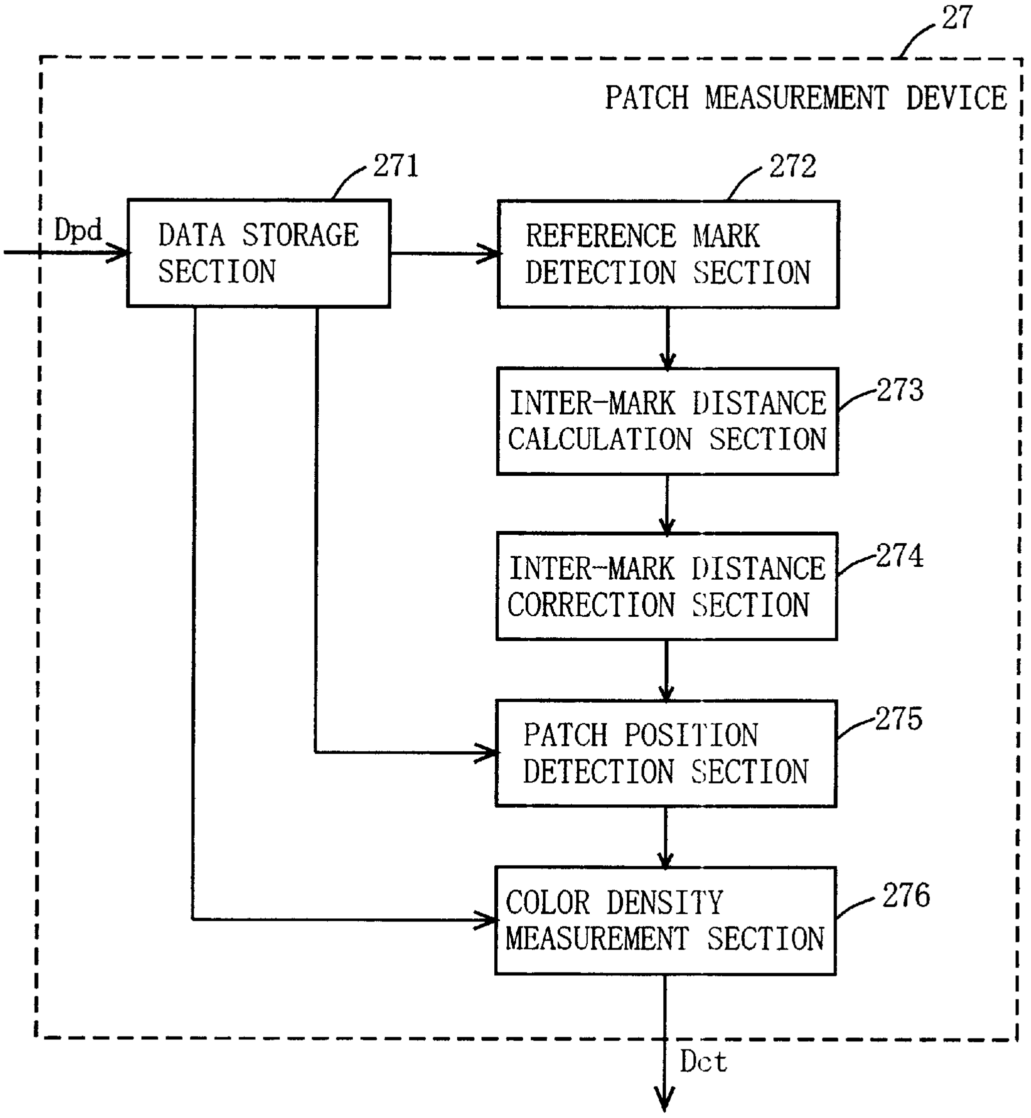
FIG. 6 is a functional block diagram illustrating the detailed structure of the patch measurement device 27 shown in FIG. 1.

FIG. 6 is a functional block diagram illustrating the detailed structure of the patch measurement device 27. In FIG. 6, the patch measurement device 27 comprises a data storage section 271, a reference mark detection section 272, an inter-mark distance calculation section 273, an inter-mark distance correction section 274, a patch position detection section 275, and a color density measurement section 276. The data storage section 271 stores the printed-image data Dpd which is sent from the image synthesis section 2603. The reference mark detection section 272 performs image processing for the printed-image data Dpd stored in the data storage section 271 to detect the positions of all cross points P in the reference marks rm (see FIGS. 9A and 9B). In other words, in the case where the printed-image data Dpd contains three reference marks rm1 to rm3, the reference mark detection section 272 detects the positions of the crosspoints P1 to P3 of the respective reference marks rm1 to rm3. The detection of reference marks rm in the printed-image data Dpd performed by the reference mark detection section 272 is typically realized through image processing such as a pattern matching process. Since such image processing is known, no further explanation thereof will be given in the description of the present embodiment.

With respect to the crosspoints P1 to P3 of the reference marks rm1 to rm3 detected by the reference mark detection section 272, the inter-mark distance calculation section 273 calculates the shortest distance between any two of the crosspoints P1 to P3 in the printed-image data Dpd (hereinafter, these shortest distances will be referred to as the "measured shortest distances"). In the following description, the measured shortest distance between the crosspoints P1 and P2 in the printed-image data Dpd as calculated by the inter-mark distance calculation section 273 will be referred to as "x12"; the measured shortest distance between the crosspoints P1 and P3 will be referred to as "x13"; and the measured shortest distance between the crosspoints P2 and P3 will be referred to as "x23". The measured shortest distances x12, x13, and x23 may collectively be referred to as "measured shortest distances x".

Based on the deployed position information Dpn from the control section 21 (used as "theoretically-known" values), the inter-mark distance correction section 274 calculates magnification correcting coefficients k by employing the theoretical shortest distances among the crosspoints P1 to P3 as known from the deployed position information Dpn and the measured shortest distances x as calculated by the inter-mark distance calculation section 273. In the following description, the theoretical shortest distance between the theoretical crosspoints P1 and P2 in the deployed position information Dpn used by the inter-mark distance correction section 274 will be referred to as "y12"; the theoretical shortest distance between the crosspoints P1 and P3 will be referred to as "y13"; and the theoretical shortest distance between the crosspoints P2 and P3 will be referred to as "y23". The theoretical shortest distance y12, y13, and y23 may collectively be referred to as "theoretical shortest distances y". The specific method used by the inter-mark distance correction section 274 to calculate the magnification correcting coefficients k will be described later.

By using the magnification correcting coefficients k calculated by the inter-mark distance correction section 274 and the deployed position information Dpn from the control section 21, the patch position detection section 275 estimates "relative measurement positions" of the patches composing each control strip cs, which are predetermined relative to the crosspoints P (as detected by the reference mark detection section 272) in the printed-image data Dpd stored in the data storage section 271. As used herein, the "relative measurement position" of a patch is the position (as taken from the relevant crosspoint P) at which the color density information Dct (described later) of the patch is actually measured. The specific method of estimating the relative measurement positions will be described later. Then, based on such a relative measurement position, the patch position detection section 275 extracts one patch and its peripheral pixels from the printed-image data Dpd stored in the data storage section 271, and finalizes the measurement position of the patch composing the control strip cs through predetermined image processing. Typically, the patch position detection section 275 finalizes the measurement position to be the center of the patch. Although the image processing used for the finalization of the measurement positions may be based on various techniques such as analyzing the pixel distribution, such techniques do not constitute a feature of the present invention, and are therefore omitted from the description in the present embodiment.

The color density measurement section 276 retrieves the pixels located at the patch measurement position as detected by the patch position detection section 275 from the data storage section 271, and thus measures the color density information Dct (e.g., density and/or dot percentage) of the printed patch at the patch measurement position. Moreover, the color density measurement section 276 sends the measured color density information Dct to the print control section 21. Based on the color density information Dct from the patch measurement device 27, as described above, the print control section 21 generates and outputs control information Dcl, in accordance with which the supply amounts of ink and/or dampening water used in the aforementioned printing mechanism 23 are adjusted. Thus, the amount of ink supplied from the ink supply unit 239 and/or the amount of dampening water supplied from the dampening water supply unit 238 are automatically controlled.

Figure 7:
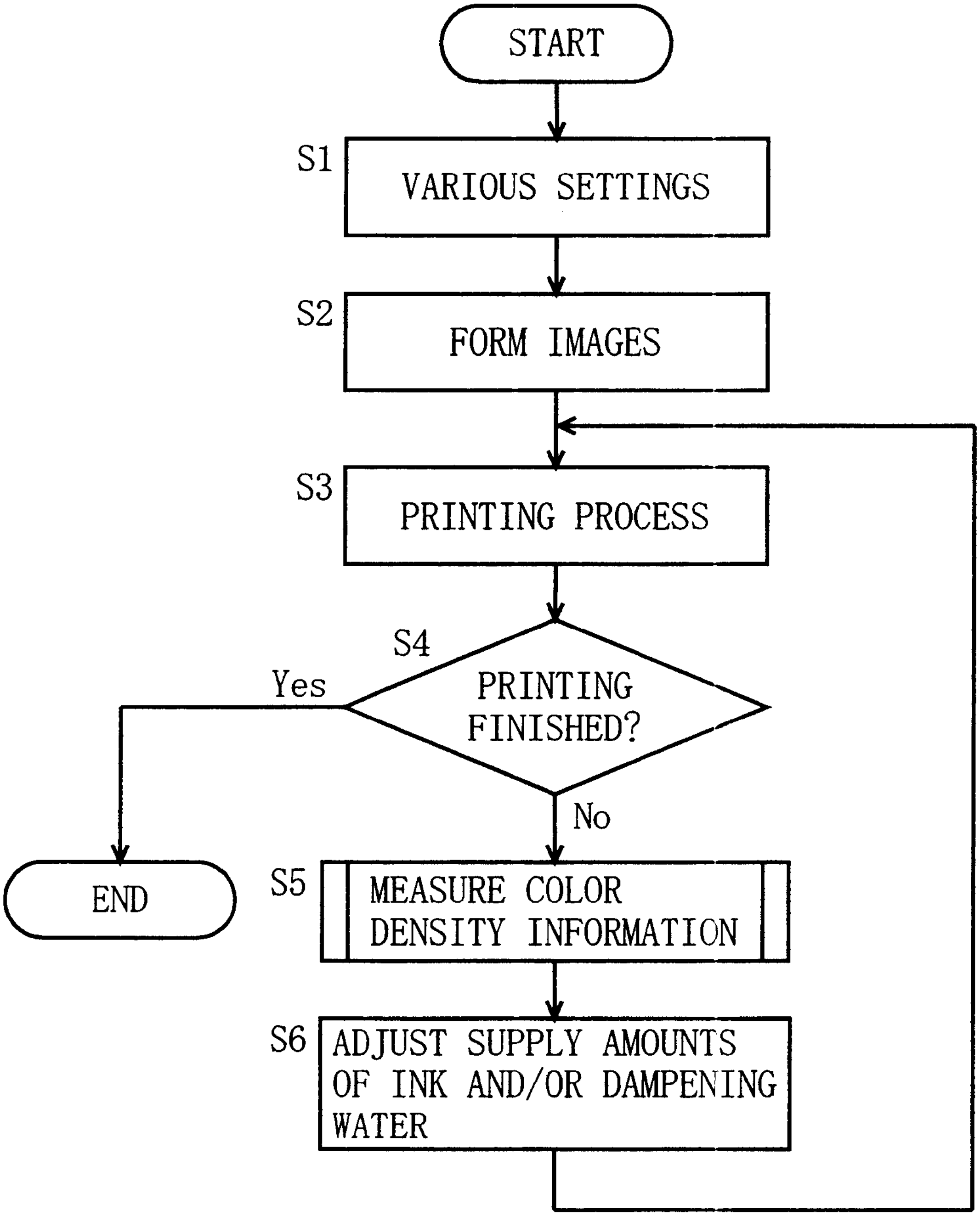
FIG. 7 is a flowchart illustrating a flow of control by the printing system shown in FIG. 1 up to the completion of a printing process.

Next, the overall operation of the printing system shown in FIG. 1 will be described with reference to FIG. 7. FIG. 7 is a flowchart illustrating a flow of control by the printing system up to the completion of a printing process.

The operator operates the terminal 1 to make various settings in the printing apparatus 2 (step S1). Typically, image-to-print data Dpg to be currently used and the number of printed materials S to be produced are set at step S1. Furthermore, not only the image-to-print data Dpg but also the aforementioned deployed position information Dpn are transmitted from the terminal 1 to the print control section 21 in the printing apparatus 2. Alternatively, the transmission of the image-to-print data Dpg maybe performed in real time, i.e., in pace with the image formation on printing plates.

Next, the printing apparatus 2 forms an image im, control strips cs and reference marks rm represented by the currently received image-to-print data Dpg on printing plates (step S2). At step S2, either the plate drum 231 or 232 is moved to the image recording position, and an unexposed printing plate which has been transported from the printing plate supply section 221 is mounted on the plate drum 231 or 232 at the image recording position. Thereafter, at the image recording section 222, an image exposure is performed on the printing plate mounted on the rotating plate drum 231 or 232 by using a laser light beam which is modulated in accordance with the image-to-print data Dpg received from the print control section 21. In other words, the image im, the control strips cs and the reference marks rm are formed on the printing plates. After the exposure is completed, the development section 223 performs a development process for the exposed printing plates in the aforementioned manner. After the development process is completed, the plate drum 231 or 232 which is currently in the image recording position is retracted to the first or second printing position. Thereafter, the plate drum 232 or 231 currently situated in the second or first printing position is moved to the image recording position, and exposure and development processes are performed for the printing plates mounted on the plate drum 232 or 231 in a manner similar to that described above. Thus, the prepress process is completed.

Next, the printing apparatus 2 performs a printing process using the printing plates which have been prepressed at step S2 (step S3). More specifically, the dampening water supply unit 238 supplies predetermined amounts of dampening water to the respective printing plates on the plate drums 231 and 232, and then the ink supply unit 239 supplies predetermined amounts of inks of corresponding colors to the printing plates. The ink images on the respective printing plates are transferred onto the blanket drums 233 and 234. On the other hand, the feed unit 240 supplies one sheet of printing paper to the feed drum 236 with the aforementioned timing. The supplied printing paper is passed from the feed drum 236 to the impression cylinder 235. While the impression cylinder 235 retaining the printing paper makes two rotations, ink images having been transferred onto the blanket drums 233 and 234 are transferred onto the printing paper. Thereafter, the printing paper is passed from the impression cylinder 235 to the discharge drum 237, and piled as a completed printed material S on the discharge base 2401 in the discharge unit 241.

Next, the printing apparatus 2 determines whether or not the number of printed materials S produced has reached the number which was set at step S1 (step S4). If the predetermined number has been reached, the process shown in FIG. 7 is completed. If the predetermined number has not been reached, the printing apparatus 2 measures color density information in the patch measurement device 27, for a predetermined number of sampled sheets (step S5). At step S5, the aforementioned color density information Dct is generated, and sent to the print control section 21. Next, based on the color density information Dct sent from the patch measurement device 27, the print control section 21 adjusts the supply amounts of ink and/or dampening water as described above (step S6), and the control returns to step S3.

Figure 8:
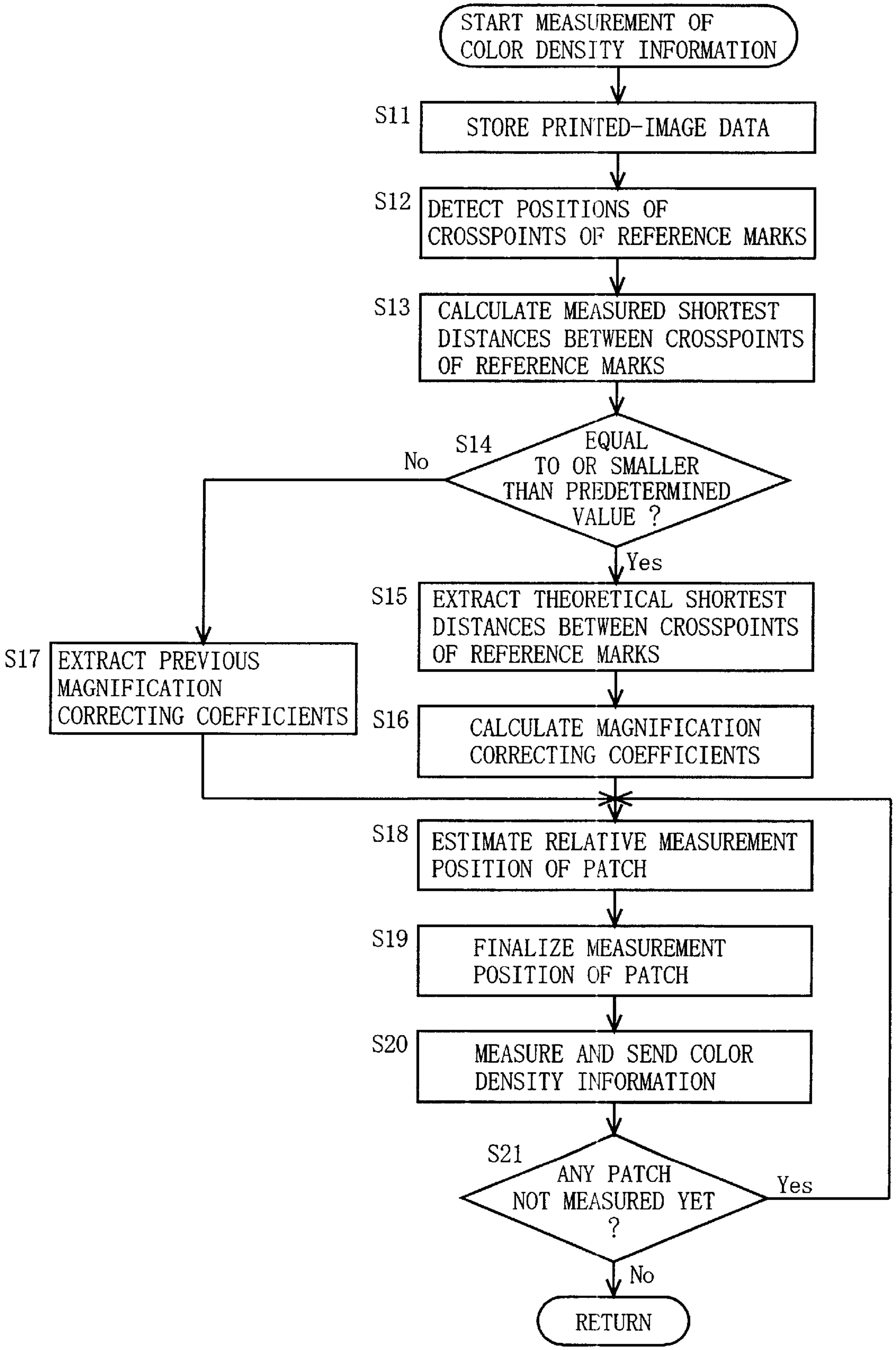
FIG. 8 is a flowchart illustrating the detailed procedure of the process performed at step 5 in FIG. 7.

Next, the detailed processing procedure of step S5 will be described with reference to FIG. 8. FIG. 8 is a flowchart illustrating the detailed procedure of the process performed at step 5 in FIG. 7.

Referring to FIG. 8, the imaging device 26 generates printed-image data Dpd and stores it to the data storage section 271 of the patch measurement device 27 (step S11), as already described with reference to FIGS. 4 and 5.

After step S11 is completed, the reference mark detection section 272 of the patch measurement device 27 performs image processing such as a pattern matching process for the printed-image data Dpd stored in the data storage section 271 to detect the positions of the respective crosspoints P1 to P3 of the reference marks rm1 to rm3 (see FIGS. 9A and 9B) (step S12).

Next, with respect to the respective crosspoints P1 to P3 of the reference marks rm1 to rm3 as detected by the reference mark detection section 272, the inter-mark distance calculation section 273 of the patch measurement device 27 calculates the measured shortest distances x among the crosspoints P1 to P3 in the printed-image data Dpd (step S13) At this step S13, if the reference mark rm1 is interposed between the other reference marks rm2 and rm3 along the second printing direction on the printed material S (as shown in FIG. 9A), the inter-mark distance calculation section 273 calculates the measured shortest distance x12 between the crosspoints P1 and P2 and the measured shortest distance x13 between the crosspoints P1 and P3 in the printed-image data Dpd.

Then, the inter-mark distance calculation section 273 determines whether the measured shortest distances x12 and x13 calculated at step S13 are equal to or smaller than a predetermined value (step S14). If they are found to be equal to or smaller than the predetermined value, the inter-mark distance calculation section 273 proceeds to step S15; if not, the inter-mark distance calculation section 273 proceeds to step S17.

At step S15, based on the deployed position information Dpn from the control section 21 (used as "theoretically-known" values), the inter-mark distance correction section 274 extracts theoretical shortest distances y among the crosspoints P1 to P3 in the deployed position information Dpn (step S15). At step S15, if the reference mark rm1 is interposed between the other reference marks rm2 and rm3 along the second printing direction on the printed material S (as shown in FIG. 9A), the inter-mark distance correction section 274 extracts a theoretical shortest distance y12 between the theoretical crosspoints P1 and P2 and a theoretical shortest distance y13 between the crosspoints P1 and P3 in the deployed position information Dpn.

Although it is illustrated above that deployed position information Dpn is extracted by the inter-mark distance correction section 274 at step S15, any information other than deployed position information Dpn may be used so long as it provides theoretically-known values. For example, the operator may measure distances between any two of the respective crosspoints P1 to P3 of the reference marks rm1 to rm3 printed on the printed material S, and utilize the measurement results as theoretical shortest distances y. In this case, the operator will input the measurement result by the use of the terminal 1, upon which the inter-mark distance correction section 274 becomes able to utilize the measurement result as the theoretical shortest distances y.

Next, the inter-mark distance correction section 274 calculates magnification correcting coefficients k by using the measured shortest distances x12 and x13 calculated at step S13 and the theoretical shortest distances y12 and y13 extracted at step S15 (step S16). Specifically, at step S16, the inter-mark distance correction section 274 calculates a magnification correcting coefficient k12 associated with the reference marks rm1 and rm2 by using the measured shortest distance x12 and the theoretical shortest distance y12, in accordance with eq. 1:

$$k12=x12/y12 \quad \text{eq. 1.}$$

Moreover, the inter-mark distance correction section 274 calculates a magnification correcting coefficient k13 associated with the reference marks rm1 and rm3 by using the measured shortest distance x13 and the theoretical shortest distance y13, in accordance with eq. 2:

$$k13=x13/y13 \quad \text{eq. 2.}$$

Thereafter, the process proceeds to the next step S18.

On the other hand, if step S14 finds that the measured shortest distances x12 and x13 which have been calculated by the inter-mark distance calculation section 273 at step S13 are not equal to or smaller than the predetermined value, then the detection of reference marks rm is regarded as failed, and the inter-mark distance correction section 274 extracts the magnification correcting coefficients k which were calculated in the previous run as the magnification correcting coefficients k for use in the current process (step S17); and the process proceeds to the next step S18. The magnification correcting coefficients k extracted at step S17 are not limited to magnification correcting coefficients k which were calculated in the previous run. For example, predetermined magnification correcting coefficients k may be extracted as fixed values.

Step S18 and the subsequent steps are directed to the calculation of patch positions using the magnification correcting coefficients k and the measuring of patch color density information In the following process, it is assumed that the color density information Dct of the aforementioned patch pc1 (see FIGS. 9A and 9B) is to be currently measured.

At step S18, by using the magnification correcting coefficients k calculated at step S16 and the deployed position information Dpn from the control section 21, the patch position detection section 275 estimates relative measurement positions of the patches composing a control strip cs, which are predetermined relative to the crosspoints P (as detected by the reference mark detection section 272) in the printed-image data Dpd stored in the data storage section 271 (step S18).

Specifically, when estimating the relative measurement position of the aforementioned patch pc1 (see FIGS. 9A and 9B) at step S18, the patch position detection section 275 first extracts theoretical patch distances hy and wy, which correspond to the patch distances h and w (see FIG. 9B) from the reference mark rm1 in the deployed position information Dpn. Then, the patch position detection section 275 calculates actual patch distances hx and wx, which together represent the relative measurement position of the patch pc1 with respect to the reference mark rm1 in the printed-image data Dpd. Note that the patch pc1 is located between the reference marks rm1 and rm3 as part of the control strip cs3 (see FIG. 9A). Accordingly, by using the magnification correcting coefficient k13 associated with the reference marks rm1 and rm3 calculated at step S16, the patch position detection section 275 calculates the actual patch distances hx and wx in accordance with eq. 3:

$$hx=k13\cdot hy$$

$$wx=k13\cdot wy \quad \text{eq. 3.}$$

Thus, at step S18, the patch position detection section 275 estimates the relative measurement position of the patch pc1 in the printed-image data Dpd to be a position which is at the actual patch distance hx along the first printing direction, and at the actual patch distance wx along the second printing direction, away from the reference mark rm1.

Since the patch pc1 to be currently measured is located closest to the reference mark rm1 among the three reference marks rm, and located between the reference marks rm1 and rm3 (see FIG. 9A), the relative measurement position in the printed-image data Dpd is indicated by the actual patch distances from the closest reference mark rm1, and calculated by using the magnification correcting coefficient k13 associated with the reference marks rm1 and rm3. Preferably, the calculation of the relative measurement position of any other patch is based on actual patch distances from the closest reference mark rm, such that the magnification correcting coefficient k12 associated with the reference marks rm1 and rm2 is to be used for any patch which is located closer to the reference mark rm2 than the reference mark rm1, and the magnification correcting coefficient k13 associated with the reference marks rm1 and rm3 is to be used for any patch which is located closer to the reference mark rm3 than the reference mark rm1.

Next, based on the relative measurement position calculated at step S18, the patch position detection section 275 extracts the pixels occupying the relative measurement position and its periphery from the printed-image data Dpd stored in the data storage section 271, and finalizes the measurement position of the patches composing the control strip cs through predetermined image processing (step S19). When finalizing the measurement position of the patch pc1 at this step S19, the patch position detection section 275 performs image processing based on a relative measurement position which is at the actual patch distance hx along the first printing direction, and at the actual patch distance wx along the second printing direction, away from the crosspoint P1 in the printed-image data Dpd. Note that, in the printed-image data Dpd, the aforementioned first printing direction extends along a line connecting the crosspoints P1 and P3 of the reference marks rm1 and rm3, the second printing direction being perpendicular to this line. By utilizing such a line as a reference for determining the first and second printing directions, even if the printed material S is imaged by the imaging device 26 with an offset, an accurate patch can be extracted from the printed-image data Dpd. Typically, the patch position detection section 275 extracts the patch center through the aforementioned image processing, and finalizes the patch center as the measurement position of the patch to be measured. Although the image processing used for the finalization of the measurement positions may be based on various techniques such as analyzing the pixel distribution, such techniques do not constitute a feature of the present invention, and are therefore omitted from the description in the present embodiment.

Next, the color density measurement section 276 retrieves the pixels located at the measurement position of the patch (patch center) as finalized by the patch position detection section 275 from the printed-image data Dpd stored in the data storage section 271, and measures the color density information Dct (e.g., density and/or dot percentage) of the printed patch at the measurement position. Moreover, the color density measurement section 276 sends the measured color density information Dct to the above-described control section 21 (step S20).

Next, the patch measurement device 27 determines whether or not there are any patches whose color density information Dct has not been measured yet (step S21). If there are any such patches, the control returns to step S18 to obtain color density information Dct of an unmeasured patch. On the other hand, if it is determined that the measurement has been completed for all patches, the patch measurement device 27 ends the procedure of FIG. 8.

At step S6, as described above, based on the color density information Dct from the patch measurement device 27, as described above, the print control section 21 generates and outputs control information Dcl, in accordance with which the supply amounts of ink and/or dampening water used in the aforementioned printing mechanism 23 are adjusted. Thus, the amount of ink supplied from the ink supply unit 239 and/or the amount of dampening water supplied from the dampening water supply unit 238 are automatically controlled.

Thus, in accordance with the patch measurement device of the present embodiment, distances between the reference marks rm are utilized to calculate a ratio between the printed-image data Dpd and the deployed position information Dpn as correcting coefficients in real time. In the calculation of patch positions in the printed-image data Dpd with respect to reference marks rm, deployed position information Dpn (i.e., theoretically-known values corresponding to the patch position) is multiplied by the correcting coefficients, whereby accurate patch positions can be calculated even if the imaging magnification for the printed-image data Dpd fluctuates. Thus, the patch measurement device 27 can accurately measure color density information Dct based on the accurate patch position calculation.

Moreover, in accordance with the patch measurement device of the present embodiment, patch positions can be accurately calculated even if the imaging magnification (associated with the imaging device which images a printed material) for the printed-image data Dpd fluctuates due to reasons associated with the imaging environment (e.g., temperature), mounting accuracy of the imaging device with respect to the printing apparatus, and/or fluctuations in the position at which the printed material is imaged (fluctuations in the distance between the imaging device and the printed material). In particular, stable position calculation is possible even if the distance between the imaging device and the printed material changes due to recoil and like actions of the printed material, which may occur when the printed material is read by the printing apparatus during the transportation of the printed material.

In the case where the imaging device is composed of a plurality of imaging units, the aforementioned fluctuations in the imaging magnification for the printed-image data Dpd may occur for each imaging unit. In accordance with the patch measurement device of the present embodiment, two magnification correcting coefficients k are calculated for each of the two regions of the printed-image data Dpd which are imaged by the two imaging units (such two regions being generated out of the read-out image data Drd obtained through the imaging by the respective imaging units), so that correction can be performed in accordance with the respective fluctuation in imaging magnification. In the case where such an advantage is not desired, or where the imaging device is composed of a single imaging unit, there is no need to obtain a plurality of magnification correcting coefficients k. For example, in the case where three reference marks rm1 to rm3 are to be imaged (see FIG. 9A), one magnification correcting coefficient k may be calculated based on the minimum distance between the crosspoints P1 to P3 of at least two of the reference marks rm1 to rm3, and it is possible to calculate all patch positions on the basis of such a magnification correcting coefficient k (e.g., a magnification correcting coefficient k23 calculated based on the minimum distance between the crosspoints P2 and P3).

In the above embodiment, the calculation of the relative measurement position of a patch is performed based on actual patch distances from the closest reference mark rm, so as to minimize the calculation error for the actual patch distances, which becomes greater for patches located farther away from the reference mark rm. However, in the case where such an effect is not desired, the relative measurement positions of patches may be calculated by utilizing one fixed reference mark rm (e.g., a reference mark rm1 located in the middle) for all actual patch distances. Although the above embodiment illustrates a preferable example where the center position of a given patch is detected, any other position in the patch may alternatively be detected. Although the above embodiment illustrates an example where magnification correcting coefficients k are calculated by utilizing minimum distances between reference marks rm, it will be appreciated that the present invention can be embodied also by calculating magnification correcting coefficients k by utilizing the length of the reference marks rm themselves (e.g., the length of the bar b or the cross mark c) or any other referential length.

While the invention has been described in detail, the foregoing description is in all aspects illustrative and not restrictive. It is understood that numerous other modifications and variations can be devised without departing from the scope of the invention.

What is claimed is:

1. A patch measurement device provided in a printing apparatus for detecting a patch position representing a position of a patch in a control strip printed on paper by the printing apparatus, wherein, the control strip and a reference mark are printed on the paper with a prescribed relative distance between the reference mark to the patch, and printed-image data representing the control strip and the reference mark printed on the paper are generated through imaging by an imaging device provided in the printing apparatus, the patch measurement device comprising:

a storage section for storing the printed-image data sent from the imaging device;

a mark detection section for detecting the reference mark based on the printed-image data stored in the data storage section;

a correction section for calculating as a correcting coefficient a ratio between a printed-image data length and a predetermined known length of a position corresponding to the printed-image data length, wherein the printed-image data length is a length on the printed-image data calculated based on the reference mark detected by the mark detection section; and a position detection section for detecting the patch position with respect to the reference mark on the printed-image data, based on the correcting coefficient calculated by the correction section and the prescribed relative distance.

2. The patch measurement device according to claim 1, wherein, a plurality of said reference marks are printed on the paper, the mark detection section detects the plurality of reference marks based on the printed-image data stored in the data storage section, the printed-image data length is calculated based on a distance between the plurality of reference marks detected by the mark detection section, and the predetermined known length is the distance between the plurality of reference marks.

3. The patch measurement device according to claim 2, wherein the position detection section detects the patch position with respect to the reference mark on the printed-image data based on one of the plurality of reference marks that is closest to the patch.

4. The patch measurement device according to claim 1, wherein, the control strip and the reference mark are printed on the paper based on image-to-print data representing an image to be printed, and the known length and the relative distance are described in the image-to-print data.

5. The patch measurement device according to claim 1, wherein the known length is set by previously measuring the length of a printed image corresponding to the printed-image data length printed on the paper.

6. The patch measurement device according to claim 1, wherein, a plurality of said reference marks are printed on the paper, the imaging device comprises a first and second imaging units, the first and second imaging units generate respectively different first and second read-out image data, each containing at least two said reference marks, such that the printed-image data is generated by synthesizing the first and second read-out image data, the mark detection section detects the plurality of reference marks based on the printed-image data stored in the data storage section, the printed-image data length comprises:

a first printed-image data length which is calculated based on a distance between the at least two reference marks contained in a region of the printed-image data generated from the first read-out image data; and a second printed-image data length which is calculated based on a distance between the at least two reference marks contained in a region of the printed-image data generated from the second read-out image data, the known length comprises:

a predetermined first known length corresponding to the first printed-image data length; and a predetermined second known length corresponding to the second printed-image data length, the correcting coefficient comprises:

a first correcting coefficient which is calculated based on a ratio between the first printed-image data length and the first known length; and a second correcting coefficient which is calculated based on a ratio between the second printed-image data length and the second known length, and the position detection section is operable to:

if the patch is within the region of the printed-image data generated from the first read-out image data, detect the patch position with respect to the reference mark on the printed-image data based on the first correcting coefficient and the prescribed relative distance for the patch, and if the patch is within the region of the printed-image data generated from the second read-out image data, detect the patch position with respect to the reference mark on the printed-image data based on the second correcting coefficient and the prescribed relative distance for the patch.

7. The patch measurement device according to claim 1, further comprising a color density measurement section for measuring color density of the patch whose position has been detected by the position detection section.

8. A printing apparatus for printing an image to be printed, a control strip, and a reference mark on paper, comprising:

a prepressing mechanism for receiving external image-to-print data representing the image to be printed, and forming the image to be printed, the control strip, and the reference mark on a printing plate, based on the image-to-print data;

a printing mechanism for applying at least ink on the printing plate fed from the prepressing mechanism, and transferring the image to be printed, the control strip, and the reference mark from the printing plate having the ink applied thereto onto the paper;

an imaging device for imaging, within the printing mechanism, a portion of the paper where at least the control strip and the reference mark are printed, thereby generating printed-image data; and a patch measurement device for, based on the printed-image data generated by the imaging device, detecting a patch position representing a position of a patch in the control strip with respect to the reference mark and measuring color density of the patch, wherein a prescribed relative distance exists between the reference mark to the patch, the patch measurement device comprising:

a storage section for storing the printed-image data sent from the imaging device;

a mark detection section for detecting the reference mark based on the printed-image data stored in the data storage section;

a correction section for calculating as a correcting coefficient a ratio between a printed-image data length and a predetermined known length of a position corresponding to the printed-image data length, wherein the printed-image data length is a length on the printed-image data calculated based on the reference mark detected by the mark detection section; and a position detection section for detecting the patch position with respect to the reference mark on the printed-image data, based on the correcting coefficient calculated by the correction section and the prescribed relative distance; and a color density measurement section for measuring the color density of the patch whose position has been detected by the position detection section, wherein the printing mechanism adjusts the amount of ink to be applied to the printing plate based on the color density of the patch having been measured by the patch measurement device.

9. The printing apparatus according to claim 8, wherein, a plurality of said reference marks are printed on the paper, and the correction section calculates the printed-image data length based on a distance between the reference marks.

10. The printing apparatus according to claim 9, wherein the position detection section detects the patch position with respect to the reference mark on the printed-image data based on one of the plurality of reference marks that is closest to the patch.

11. A patch measurement method for detecting a patch position representing the position of a patch in a control strip printed on paper, wherein the control strip and a reference mark are printed on the paper with a prescribed relative distance between the reference mark to the patch, the method comprising:

a storage step of storing printed-image data representing the control strip and the reference mark printed on the paper;

a mark detection step of detecting the reference mark based on the printed-image data stored by the data storage step;

a correction step of calculating as a correcting coefficient a ratio between a printed-image data length and a predetermined known length of a position corresponding to the printed-image data length, wherein the printed-image data length is a length on the printed-image data calculated based on the reference mark detected by the mark detection step; and a position detection step of detecting the patch position with respect to the reference mark on the printed-image data, based on the correcting coefficient calculated by the correction step and the prescribed relative distance.

12. The patch measurement method according to claim 11, a plurality of said reference marks are printed on the paper, the mark detection step detects the plurality of reference marks based on the printed-image data stored by the data storage step, the printed-image data length is calculated based on a distance between the plurality of reference marks detected by the mark detection step, and the predetermined known length is the distance between the plurality of reference marks.

13. The patch measurement method according to claim 12, wherein the position detection step detects the patch position with respect to the reference mark on the printed-image data based on one of the plurality of reference marks that is closest to the patch.

14. The patch measurement method according to claim 11, wherein, a plurality of said reference marks are printed on the paper, the printed-image data stored by the data storage step represents the control strip and the plurality of reference marks printed on the paper, the printed-image data being generated by synthesizing respectively different first and second read-out image data, each containing at least two said reference marks, the mark detection step detects the plurality of reference marks based on the printed-image data stored by the data storage step, the printed-image data length comprises:

a first printed-image data length which is calculated based on a distance between the at least two reference marks contained in a region of the printed-image data generated from the first read-out image data; and a second printed-image data length which is calculated based on a distance between the at least two reference marks contained in a region of the printed-image data generated from the second read-out image data, the known length comprises:

a predetermined first known length corresponding to the first printed-image data length; and a predetermined second known length corresponding to the second printed-image data length, the correcting coefficient comprises:

a first correcting coefficient which is calculated based on a ratio between the first printed-image data length and the first known length; and a second correcting coefficient which is calculated based on a ratio between the second printed-image data length and the second known length, and the position detection step comprises:

if the patch is within the region of the printed-image data generated from the first read-out image data, detecting the patch position with respect to the reference mark on the printed-image data based on the first correcting coefficient and the prescribed relative distance for the patch, and if the patch is within the region of the printed-image data generated from the second read-out image data, detecting the patch position with respect to the reference mark on the printed-image data based on the second correcting coefficient and the prescribed relative distance for the patch.

* * * * *